(12) United States Patent
Kato et al.

(10) Patent No.: US 11,336,997 B2
(45) Date of Patent: May 17, 2022

(54) CORRELATION FUNCTION GENERATION APPARATUS, CORRELATION FUNCTION GENERATION METHOD, CORRELATION FUNCTION GENERATION PROGRAM, AND WAVE SOURCE DIRECTION ESTIMATION APPARATUS

(71) Applicant: NEC Corporation, Tokyo (JP)

(72) Inventors: Masanori Kato, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 260 days.

(21) Appl. No.: 16/476,897

(22) PCT Filed: Jan. 11, 2017

(86) PCT No.: PCT/JP2017/000680
§ 371 (c)(1),
(2) Date: Jul. 10, 2019

(87) PCT Pub. No.: WO2018/131099
PCT Pub. Date: Jul. 19, 2018

(65) Prior Publication Data
US 2019/0335273 A1    Oct. 31, 2019

(51) Int. Cl.
*G10L 25/06* (2013.01)
*H04R 3/00* (2006.01)
(Continued)

(52) U.S. Cl.
CPC .............. *H04R 3/005* (2013.01); *G10L 25/06* (2013.01); *G10L 25/18* (2013.01); *G10L 25/51* (2013.01); *H04R 1/406* (2013.01)

(58) Field of Classification Search
CPC ................................ G10L 25/06; G10L 25/18
See application file for complete search history.

(56) References Cited

U.S. PATENT DOCUMENTS

2007/0168341 A1* 7/2007 Nichols ............... G06F 16/2477
2010/0266004 A1* 10/2010 Aoki .......................... H04B 3/46
375/226

FOREIGN PATENT DOCUMENTS

JP        2009-287942 A    12/2009
JP        2011-33717 A      2/2011
(Continued)

OTHER PUBLICATIONS

Knapp et al., "The Generalized Correlation Method for Estimation of Time Delay," IEEE Transactions on Acoustics, Speech and Signal Processing, Aug. 1976, vol. 24, No. 4, pp. 320-327 (total 8 pages).

(Continued)

*Primary Examiner* — Thomas H Maung
(74) *Attorney, Agent, or Firm* — Sughrue Mion, PLLC

(57) ABSTRACT

A correlation function having a clear peak is generated even in an environment in which an ambient noise level is high. A correlation function generation apparatus (100) includes a plurality of input signal obtaining units (101), a changing unit (102), a cross-spectrum calculator (103), a variance calculator (104), and a correlation function calculator (105). The input signal obtaining unit (101) obtains a wave generated by a wave source as an input signal. The transformer (102) obtains a plurality of frequency domain signals by transforming a plurality of input signals obtained by the plurality of input signal obtaining units. The cross-spectrum calculator (103) calculates a cross-spectrum based on the plurality of frequency domain signals. The variance calculator (104) calculates the variance of the cross-spectrum. The correlation function calculator (105) calculates and generates a correlation function based on the cross-spectrum and the variance.

12 Claims, 21 Drawing Sheets

(51) Int. Cl.
    *G10L 25/18*   (2013.01)
    *G10L 25/51*   (2013.01)
    *H04R 1/40*    (2006.01)

(56) References Cited

FOREIGN PATENT DOCUMENTS

JP    2012-185009 A    9/2012
WO    2013/042201 A1   3/2013

OTHER PUBLICATIONS

Ianniello, "Time Delay Estimation Via Cross-Correlation in the Presence of Large Estimation Errors," IEEE Transactions on Acoustics, Speech and Signal Processing, Dec. 1982, vol. 30, No. 6, pp. 998-1003 (total 6 pages).
International Search Report for PCT/JP2017/000680 dated Mar. 28, 2017 [PCT/ISA/210].
Written Opinion of the International Searching Authority for PCT/JP2017/000680 dated Mar. 28, 2017 [PCT/ISA/237].

* cited by examiner

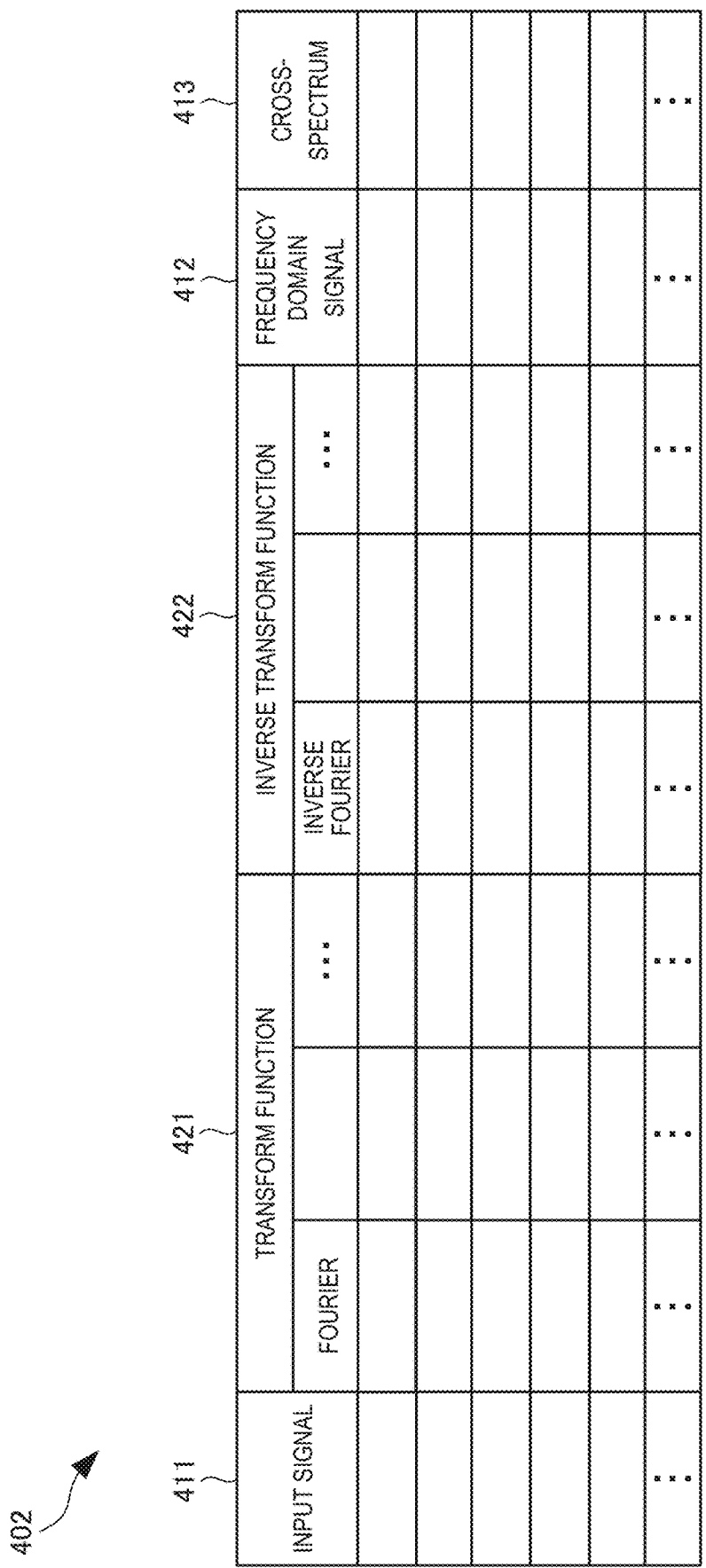

| 403 → | | | | | | | |
|---|---|---|---|---|---|---|---|
| | 424 | | | 431 VARIANCE METHOD | | | 414 |
| | CROSS-SPECTRUM | PROBABILITY THEORY | STANDARD DEVIATION | SQUARE ERROR | ABSOLUTE VALUE ERROR | CIRCULAR VARIANCE | CIRCULAR STANDARD DEVIATION | ... | VARIANCE |
| | | | | | | | | ... | |
| | | | | | | | | ... | |
| | | | | | | | | ... | |
| | | | | | | | | ... | |
| | ... | ... | ... | ... | ... | ... | ... | ... | ... |

FIG. 4C

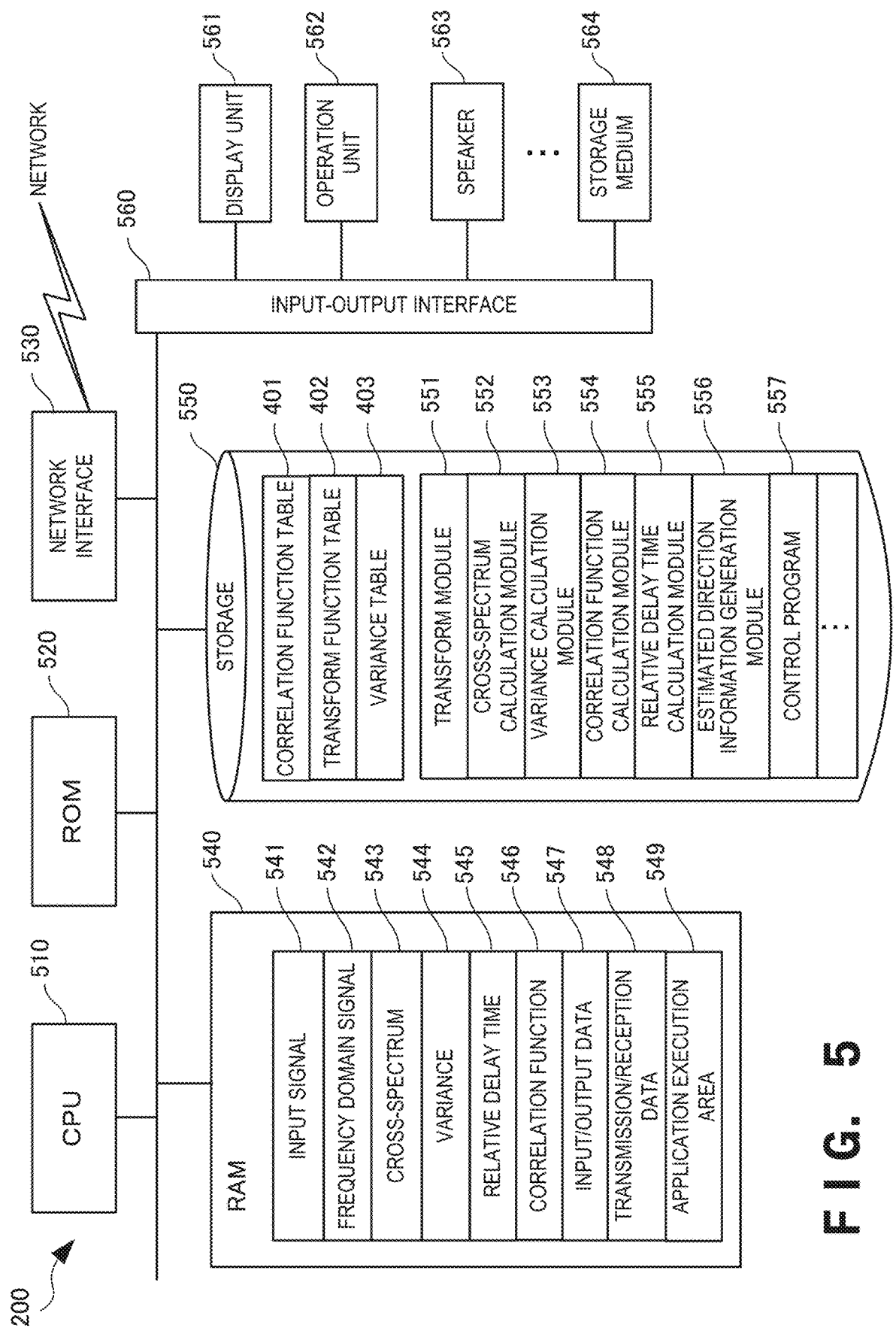

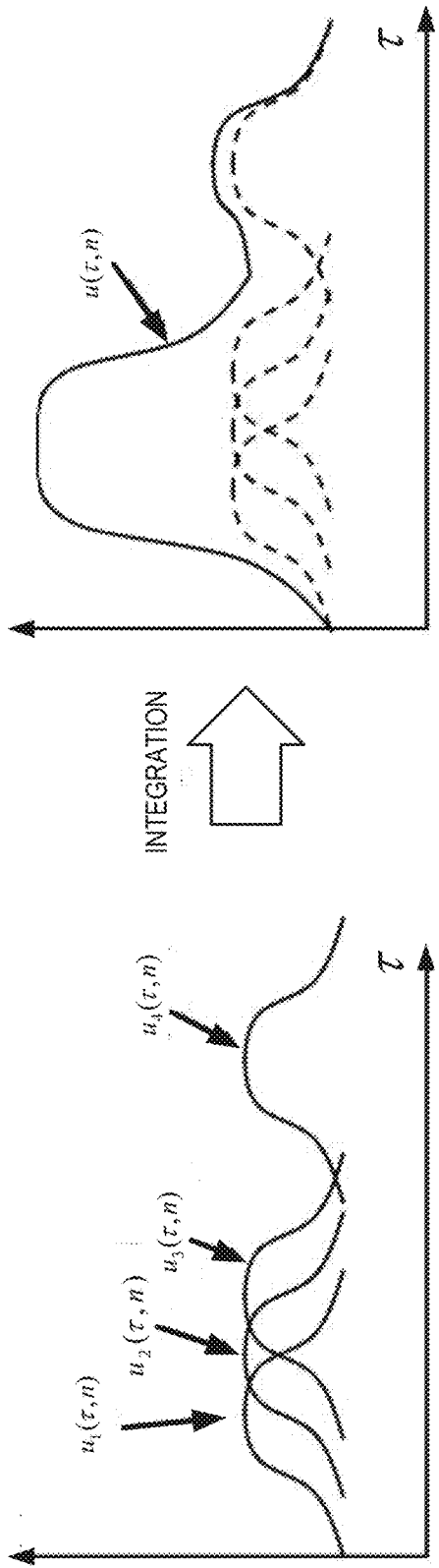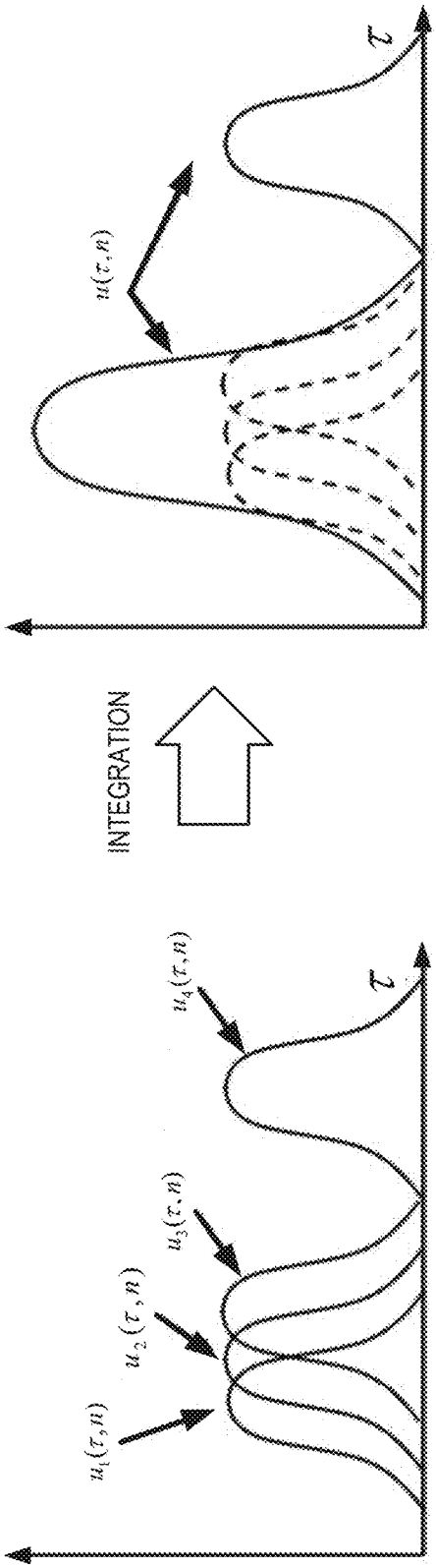
FIG. 12D

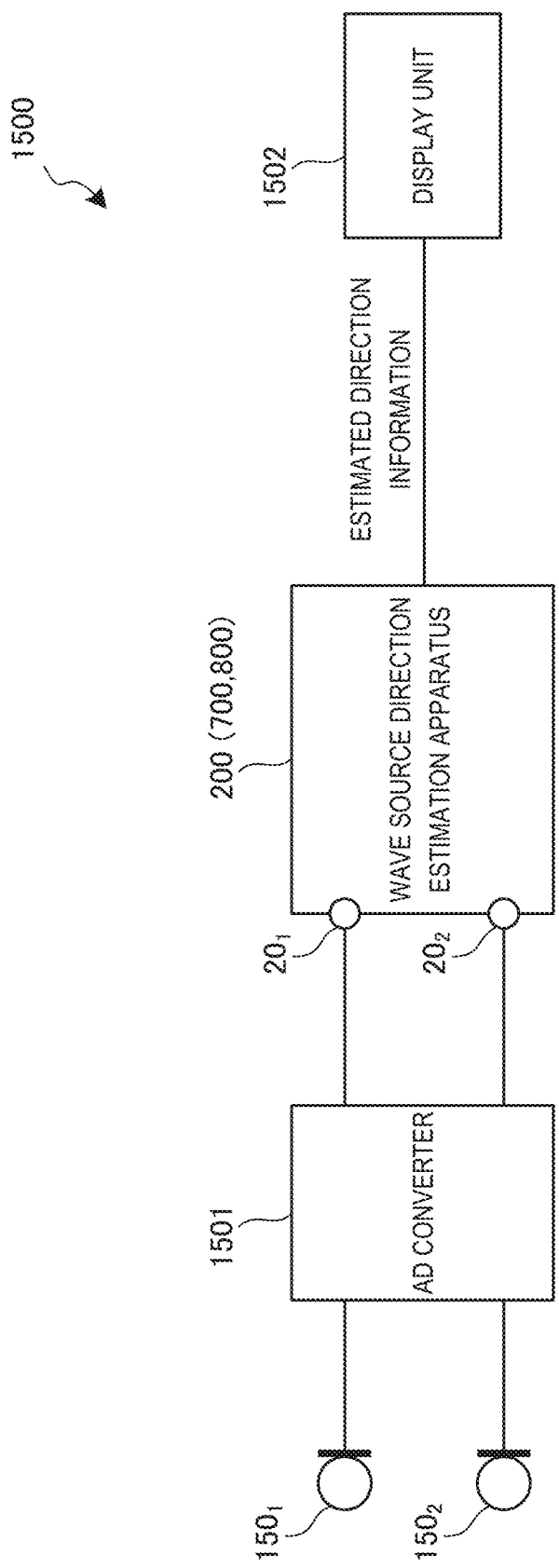
F I G. 15A

CORRELATION FUNCTION GENERATION APPARATUS, CORRELATION FUNCTION GENERATION METHOD, CORRELATION FUNCTION GENERATION PROGRAM, AND WAVE SOURCE DIRECTION ESTIMATION APPARATUS

This application is a National Stage Entry of PCT/JP2017/000680 filed on Jan. 11, 2017, the contents of all of which are incorporated herein by reference, in their entirety.

TECHNICAL FIELD

The present invention relates to a correlation function generation apparatus, a correlation function generation method, a correlation function generation program, and a wave source direction estimation apparatus.

BACKGROUND ART

In the above technical field, patent literature 1 discloses a technique that calculates a cross-spectrum from two acoustic signals, regards a frequency component, of phase components of the cross-spectrum, which has a small time fluctuation as a sound component and a portion having a large time fluctuation as a noise component, and suppresses the noise component. In this technical field, patent literature 2 discloses a technique that calculates a time difference between incoming radio waves from the frequency gradient of the phase in a high-coherence-level frequency band indicated by the cross-spectrum of two reception signals, thereby finding the incoming direction of the radio wave. Furthermore, in the above technical field, each of non-patent literatures 1 and 2 discloses a method of estimating the direction of a sound source (a generation source and generation place of a sound wave) by using source reception signals of two microphones. More specifically, a mutual correlation function between the two sound reception signals is obtained from the signals. Then, a time difference to which the mutual correlation function gives a maximum value is calculated as an incoming time difference between the sound waves, thereby estimating the sound wave incoming direction.

CITATION LIST

Patent Literature

Patent literature 1: Japanese Patent Laid-Open No. 2011-033717
Patent literature 2: Japanese Patent Laid-Open No. 2009-287942

Non-Patent Literature

Non-patent literature 1: C. H. Knapp and G. C. Carter, "The generalized correlation method for estimation of time delay," IEEE Trans. Acoustics, Speech and Signal Processing, vol. 24, no. 4, pp. 320-327, August 1976.
Non-patent literature 2: J. P. Ianniello, "Time delay estimation via cross-correlation in the presence of large estimation errors," IEEE Trans. Acoustics, Speech and Signal Processing, vol. 30, no. 6, pp. 998-1003, December 1982.

SUMMARY OF THE INVENTION

Technical Problem

In the techniques described in the above literatures, however, a correlation function having a clear peak cannot be generated in an environment in which an ambient noise level is high.

The present invention enables to provide a technique of solving the above-described problem.

Solution to Problem

One example aspect of the present invention provides a correlation function generation apparatus comprising
a plurality of input signal obtaining units that obtain a wave generated by a wave source as an input signal,
a transformer that obtains a plurality of frequency domain signals by transforming a plurality of input signals obtained by the plurality of input signal obtaining units,
a cross-spectrum calculator that calculates a cross-spectrum based on the plurality of frequency domain signals,
a variance calculator that calculates a variance of the cross-spectrum, and
a correlation function calculator that calculates a correlation function based on the cross-spectrum and the variance.

Another example aspect of the present invention provides a correlation function generation method comprising
performing a plurality of input signal obtaining steps of obtaining a wave generated by a wave source as an input signal,
obtaining a plurality of frequency domain signals by transforming a plurality of input signals obtained by a plurality of input signal obtaining units,
calculating a cross-spectrum based on the plurality of frequency domain signals,
calculating a variance of the cross-spectrum, and
calculating a correlation function based on the cross-spectrum and the variance.

Still other example aspect of the present invention provides a correlation function generation program for causing a computer to execute a method, comprising
performing a plurality of input signal obtaining steps of obtaining a wave generated by a wave source as an input signal,
obtaining a plurality of frequency domain signals by transforming a plurality of input signals obtained by a plurality of input signal obtaining units,
calculating a cross-spectrum based on the plurality of frequency domain signals,
calculating a variance of the cross-spectrum, and
calculating a correlation function based on the cross-spectrum and the variance.

Still other example aspect of the present invention provides a wave source direction estimation apparatus including the abovementioned correlation function generation apparatus, and
estimating a direction of the wave source based on a correlation function generated by the correlation function generation apparatus.

Advantageous Effects of Invention

According to the present invention, a correlation function having a clear peak can be generated even in an environment in which an ambient noise level is high.

BRIEF DESCRIPTION OF DRAWINGS

FIG. 4B is a view for explaining an example of a transform function table of the wave source direction estimation apparatus according to the second example embodiment of the present invention;

FIG. 4C is a view for explaining an example of a variance table of the wave source direction estimation apparatus according to the second example embodiment of the present invention;

FIG. 5 is a block diagram for explaining the hardware configuration of the wave source direction estimation apparatus according to the second example embodiment of the present invention;

FIG. 12D is a view for explaining the relationship between a difference between the widths of kernel function spectra and integrated correlation functions in the wave source direction estimation apparatus according to the fifth example embodiment of the present invention;

FIG. 15A is a view for explaining the configuration of a wave source direction estimation system according to the eighth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

Also, an estimation target of wave source direction estimation apparatuses according to the following example embodiments is not limited to the generation source of a sound wave as an oscillation wave of air or water. These apparatuses are also applicable to the generation source of a vibration wave using earth or a solid as a medium, such as an earthquake or a landslide. In this case, a vibration sensor is used instead of a microphone in a device for converting a vibration wave into an electric signal. Furthermore, the wave source direction estimation apparatuses according to the following example embodiments can be applied to direction estimation using a radio wave, instead of a vibration wave of a gas, a liquid, or a solid. In this case, an antenna is used as a device for converting the radio wave into an electric signal. The following example embodiments will be explained by assuming that a wave source is a sound source.

First Example Embodiment

A correlation function generation apparatus 100 according to the first example embodiment of the present invention will be explained with reference to FIG. 1. The correlation function generation apparatus 100 is an apparatus for generating a correlation function having a clear peak.

Figure 1:
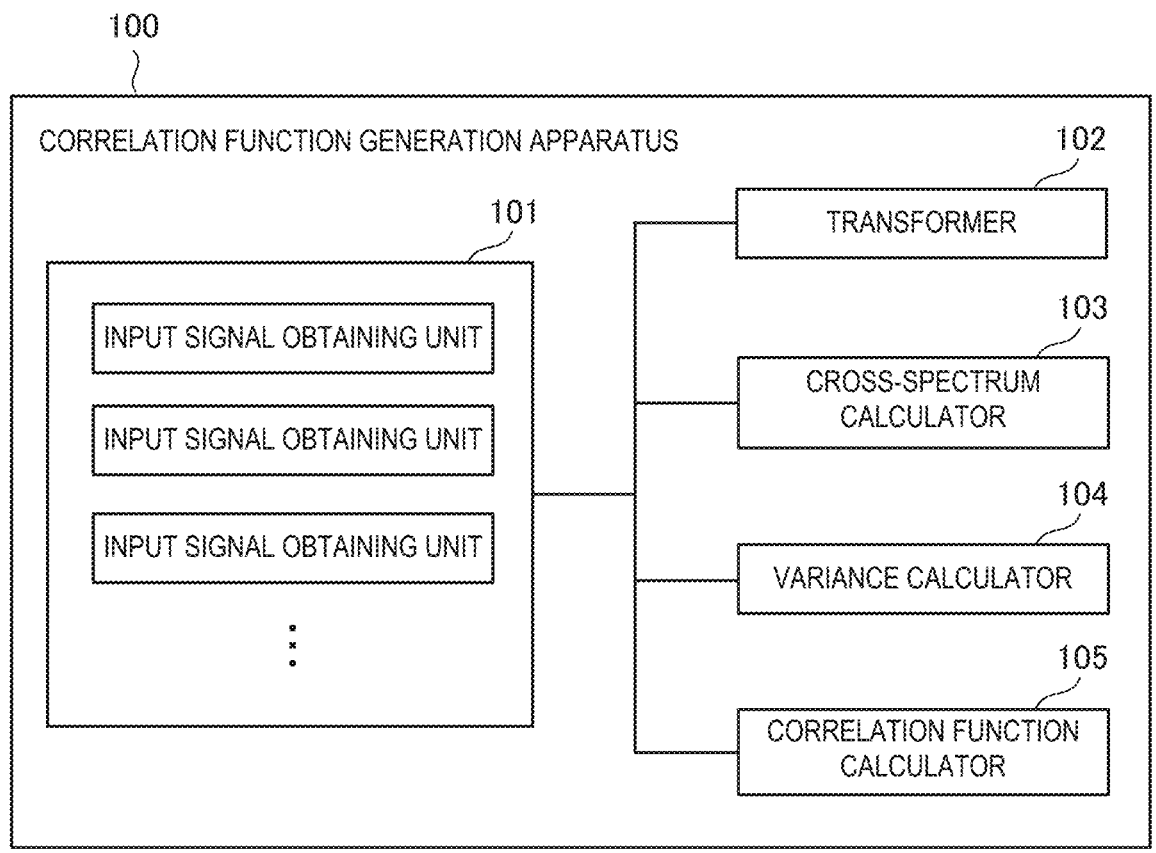
FIG. 1 is a block diagram showing the arrangement of a correlation function generation apparatus according to the first example embodiment of the present invention.

As shown in FIG. 1, the correlation function generation apparatus 100 includes a plurality of input signal obtaining units 101, a transformer 102, a cross-spectrum calculator 103, a variance calculator 104, and a correlation function calculator 105.

The input signal obtaining unit 101 obtains a wave generated by a wave source as an input signal. The transformer 102 transforms a plurality of input signals obtained by the plurality of input signal obtaining units 101, thereby obtaining a plurality of frequency domain signals. The cross-spectrum calculator 103 calculates a cross-spectrum based on the plurality of frequency domain signals. The variance calculator 104 calculates a variance of the cross-spectrum. The correlation function calculator 105 calculates and generates a correlation function based on the cross-spectrum and the variance.

According to this example embodiment, a correlation function having a clear peak can be generated even in an environment in which an ambient noise level is high.

Second Example Embodiment

<Technical Premise>

In the techniques described in non-patent literatures 1 and 2, it is difficult to accurately estimate the direction of a sound source existing far away in an environment such as the outdoors in which an ambient noise level is high. For example, when a sound source (target sound source) of an estimation target exists in a place far away from a microphone, the volume of a sound radiated from the target sound source becomes very small when arriving at the microphone. Therefore, the sound of the target sound source is buried in the ambient environmental noise, and this makes it impossible to generate a correlation function having a clear peak. Consequently, the target sound source direction estimation accuracy sometimes decreases.

<Technique of this Example Embodiment>

A wave source direction estimation apparatus 200 according to the second example embodiment of the present invention will be explained below with reference to FIGS. 2 to 6.

Figure 2:
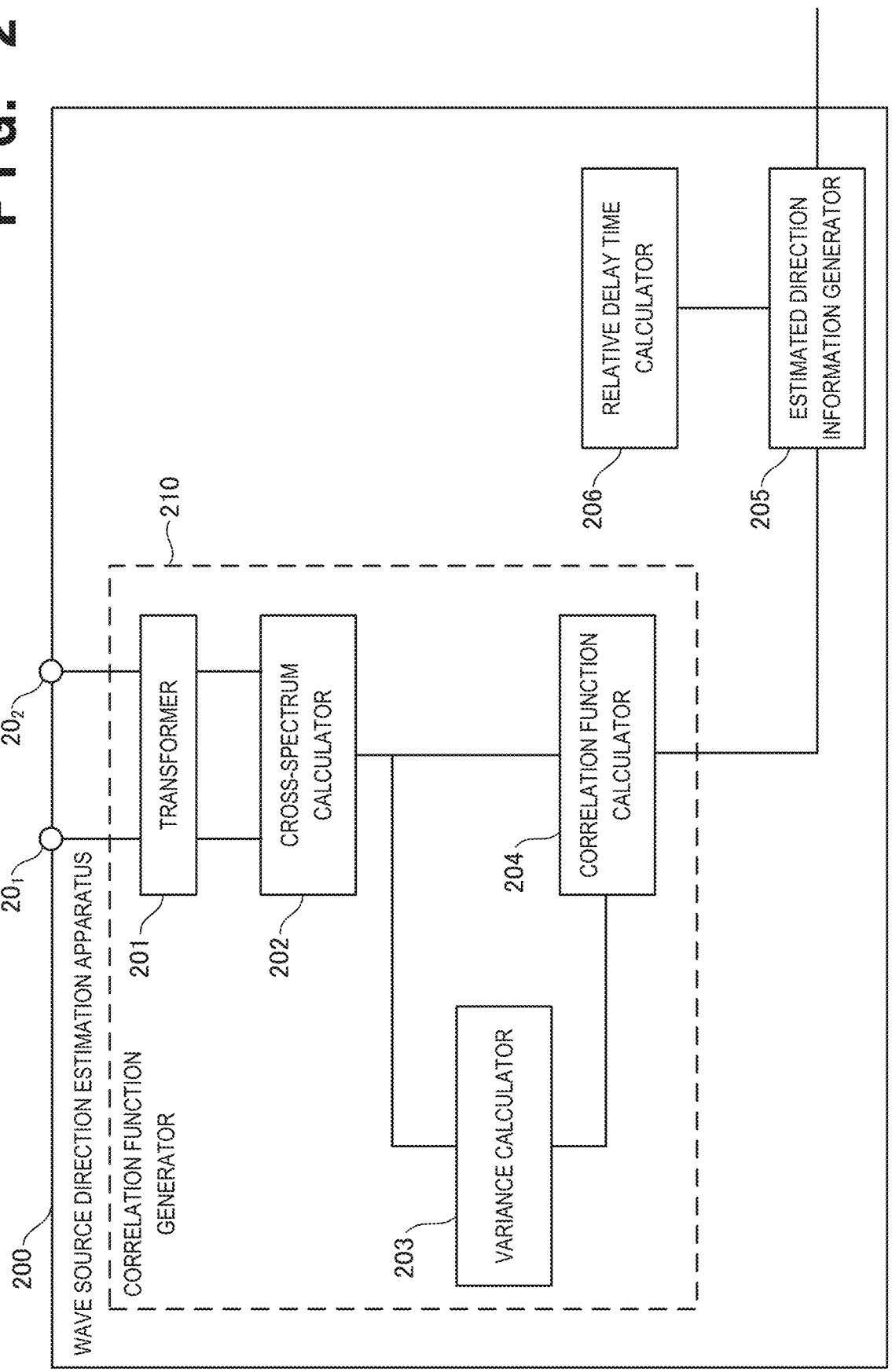
FIG. 2 is a block diagram for explaining the arrangement of a wave source direction estimation apparatus including a correlation function generator according to the second example embodiment of the present invention.

FIG. 2 is a block diagram for explaining the arrangement of the wave source direction estimation apparatus 200 according to this example embodiment. The wave source direction estimation apparatus 200 of this example embodiment functions as a part of an apparatus such as a digital video camera, a smartphone, a portable phone, a laptop computer, or a passive sonar. The wave source direction estimation apparatus 200 is also incorporated into an abnormal sound detector for, e.g., suspicious drone detection, scream detection, or vehicle accident detection, which detects an abnormality based on a voice or a sound. However, the wave source direction estimation apparatus 200 according to this example embodiment is not limited to these applications, and is applicable to any wave source direction estimation apparatus required to estimate the direction of a target sound source from a received sound.

The wave source direction estimation apparatus 200 includes an input terminal $20_1$, an input terminal $20_2$, a transformer 201, a cross-spectrum calculator 202, a variance calculator 203, a correlation function calculator 204, an estimated direction information generator 205, and a relative delay time calculator 206. Note that the transformer 201, the cross-spectrum calculator 202, the variance calculator 203, and the correlation function calculator 204 form a correlation function generator 210.

(Input Terminals 20)

Sounds in which the sound of a target sound source and various kinds of noise generated around microphones as sound collecting devices are mixed are input as digital signals (sample value series) to the input terminals $20_1$ and $20_2$. In this example embodiment, the sound signals input to the input terminals $20_1$ and $20_2$ are called input signals. Let $x_1(t)$ and $x_2(t)$ be input signals supplied to the input terminals $20_1$ and $20_2$ at time t.

A microphone as a sound collecting device collects a sound to be input to the input terminal. Since a plurality of input terminals exist, two microphones equal in number to the terminals are used when collecting the sound of the target sound source. In this example embodiment, the input terminals and the microphones are in one-to-one correspondence with each other, and it is assumed that a sound collected by the mth microphone is supplied to the mth input terminal. Accordingly, an input signal supplied to the mth input terminal is also called "an input signal of the mth microphone".

The wave source direction estimation apparatus 200 estimates the direction of a sound source by using a difference between times at which the sound of the target sound source arrives at the two microphones. Since, therefore, a microphone interval is also important information, not only the input signals but also microphone position information are supplied to the wave source direction estimation apparatus 200.

(Transformer 201)

The transformer 201 transforms the input signals supplied from the input terminals $20_1$ and $20_2$, and supplies the signals to the cross-spectrum calculator 202. This transform is performed in order to decompose the input signals into a plurality of frequency components. In this example embodiment, a case using typical Fourier transform will be explained.

Two types of input signals $x_m(t)$ where m is the input terminal number are input to the transformer 201. From the input signals supplied from the input terminals, the transformer 201 cuts out waveforms having an appropriate length by shifting them by a predetermined period. A signal interval cut out as described above is called a frame, the length of the cutout waveform is called a frame length, and the frame shifting period is called a frame period. Then, the cutout signals are transformed into frequency domain signals by using Fourier transform. Letting n be the frame number and $x_m(t,n)$ (t=0, 1, ..., K−1) be the cutout input signal, Fourier transform $X_m(k,n)$ of $x_m(t,n)$ is calculated as follows:

$$X_m(k, n) = \sum_{t=0}^{K-1} x_m(t, n)\exp\left(-j\frac{2\pi tk}{K}\right) \quad (1)$$

where j represents an imaginary number unit (the square root of −1), and exp represents an exponential function. Also, k represents a frequency bin number, and is an integer from 0 (inclusive) to K−1 (inclusive). For the sake of simplicity, k will simply be called "a frequency" instead of the frequency bin number.

(Cross-Spectrum Calculator 202)

The cross-spectrum calculator 202 calculates a cross-spectrum based on the transformed signals supplied from the transformer 201, and transmits the cross-spectrum to the variance calculator 203 and the correlation function calculator 204. The cross-spectrum calculator 202 calculates the product of the complex conjugate of the transformed signal $X_2(k,n)$ and the transformed signal $X_1(k,n)$. Letting $S_{12}(k,n)$ be the cross-spectrum of the transformed signals, the cross-spectrum is calculated as follows:

$$S_{12}(k,n)=X_1(k,n)\cdot\text{conj}(X_2(k,n)) \quad (2)$$

where $\text{conj}(X_2(k,n))$ represents the complex conjugate of $X_2(k,n)$. It is also possible to use a cross-spectrum normalized by an amplitude component, instead of the cross-spectrum calculated by equation (2). A cross-spectrum like this is calculated as follows:

$$S_{12}(k, n) = \frac{X_1(k, n) \cdot \text{conj}(X_2(k, n))}{|X_1(k, n)||X_2(k, n)|} \quad (3)$$

(Variance Calculator 203)

The variance calculator 203 calculates the variance of the cross-spectrum by using the cross-spectrum supplied from the cross-spectrum calculator 202, and transmits the variance to the correlation function calculator 204. In this example embodiment, an example in which the variance is calculated for each frequency bin from a cross-spectrum input in the past will be explained. This calculation may also be performed for each subband obtained by binding a plurality of frequency bins, instead of each frequency bin, or by using all frequency bins. It is also possible to calculate the variance by combining them. When the calculation is performed for each subband, the number of bands for which the variance is calculated decreases, so the calculation amount can be reduced.

The variance to be calculated by the variance calculator 203 is not the variance of a cross-spectrum but the variance of the phase of a cross-spectrum. The phase of a cross-spectrum is the argument of a cross-spectrum when regarding a cross-spectrum as a complex number. Also, the variance is an index indicating the degree of scattering of a time series of a phase with respect to a given reference value, i.e., the spread of a phase distribution. Accordingly, the variance in this example embodiment is not limited to the definition of the variance in the probability theory, and a standard deviation is also an example of the variance. A typical example of the variance follows the definition of the probability theory. In this case, letting $\arg(S_{12}(k,n))$ be the phase of a cross-spectrum $S_{12}(k,n)$ in a frequency bin k of the nth frame, a variance $V_{12}(k,n)$ of the frequency bin k is calculated as follows from phases $\arg(S_{12}(k,n))$, $\arg(S_{12}(k,n-1))$, $\arg(S_{12}(k,n-2))$, ..., $\arg(S_{12}(k,n-L+1))$ of (L−1) frames in the past:

$$V_{12}(k, n) = \frac{1}{L}\sum_{m=0}^{L-1}\left(\arg(S_{12}(k, n - m)) - \frac{1}{L}\sum_{l=0}^{L-1}\arg(S_{12}(k, n - l))\right)^2 \quad (4)$$

Also, the variance is calculated as follows based on the definition of a standard deviation:

$$V_{12}(k, n) = \sqrt{\frac{1}{L}\sum_{m=0}^{L-1}\left(\arg(S_{12}(k, n - m)) - \frac{1}{L}\sum_{l=0}^{L-1}\arg(S_{12}(k, n - l))\right)^2} \quad (5)$$

Furthermore, the sum total of square errors to a predetermined reference value is also an example of the variance. In this case, the variance $V_{12}(k,n)$ is calculated as follows:

$$V_{12}(k, n) = \frac{1}{L}\sum_{m=0}^{L-1}(\arg(S_{12}(k, n - m)) - \arg(S_0))^2 \quad (6)$$

where $\arg(S_0)$ is a reference phase. It is also possible to use absolute value errors instead of square errors.

$$V_{12}(k, n) = \frac{1}{L}\sum_{m=0}^{L-1}|\arg(S_{12}(k, n - m)) - \arg(S_0)|^2 \quad (7)$$

where |x| represents the absolute value of x.

Since the phase is angle information, it is also possible to use a variance (circular variance) or a standard deviation (circular standard deviation) defined by the directional statistics. When using the circular variance, the variance V12 (k,n) is calculated as follows:

$$V_{12}(k,n)=1-|R(k,n)| \quad (8)$$

where $R(k,n)$ is the average of cross-spectra, and is called a circular average in the directional statistics. $R(k,n)$ is calculated as follows:

$$R(k, n) = \frac{1}{L}\sum_{m=0}^{L-1} S_{12}(k, n - m) \quad (9)$$

Note that $S_{12}(k,n)$ of equation (9) is limited to "the cross-spectrum normalized by the amplitude component" of equation (3). As the average of cross-spectra, it is possible to use leaky integration as follows, instead of the moving average of equation (8):

$$R(k,n)=(1-\alpha)R(k,n-1)+\alpha S_{12}(k,n) \quad (10)$$

where $\alpha$ is a real number and satisfies $0<\alpha<1$.

The following variance as a modification of equation (8) is also effective:

$$V_{12}(k,n)=1-R(k,n)^2 \quad (11)$$

When using the circular standard deviation, the variance $V_{12}(k,n)$ is calculated as follows:

$$V_{12}(k,n)=\sqrt{-2\ln|R(k,n)|} \quad (12)$$

where $\ln(x)$ represents a natural logarithm of x. It is also possible to use an angular deviation known as a statistical amount similar to the circular standard deviation.

$$V_{12}(k,n)=\sqrt{2(1-|R(k,n)|)} \quad (13)$$

When using the directional statistics as described above, various variances can be obtained based on the circular average. Accordingly, the variance calculation method is not limited to the above equations, and it is also possible to use a multidimensional function, a polynomial, and a nonlinear function of the circular average, and a combination thereof.

It is also effective to add a correction process to the variance obtained as described above, in order to improve the accuracy of the variance. That is, the corrected variance may also be transmitted, instead of the variance, to the correlation function calculator 204. This correction is performed by using a variance existing in the periphery on a time-frequency plane (a variance existing in a frame or a frequency in the periphery of a correction target). A typical example is a method of calculating the average value of variances. In this case, a corrected variance $VV_{12}(k,n)$ is calculated as follows:

$$VV_{12}(k, n) = \frac{1}{(P_1+1)(2P_2+1)}\sum_{m=n-P_1}^{n}\sum_{f=k-P_2}^{k+P_2} V_{12}(f, m) \quad (14)$$

where $P_1$ and $P_2$ are predetermined constants. As another example, if the variance of a plurality of adjacent frequencies or frames has variations, the possibility that the frames or frequencies contain a target signal is low, so the variance is increased. Also, the variance is decreased if an exceptionally low variance value is found in adjacent frequencies or frames.

(Correlation Function Calculator 204)

The correlation function calculator 204 calculates a correlation function based on the cross-spectrum supplied from the cross-spectrum calculator 202 and the variance supplied from the variance calculator 203, and transmits the correlation function to the estimation direction information generator 205. Details of the correlation function calculator 204 will be explained below with reference to FIG. 3.

Figure 3:
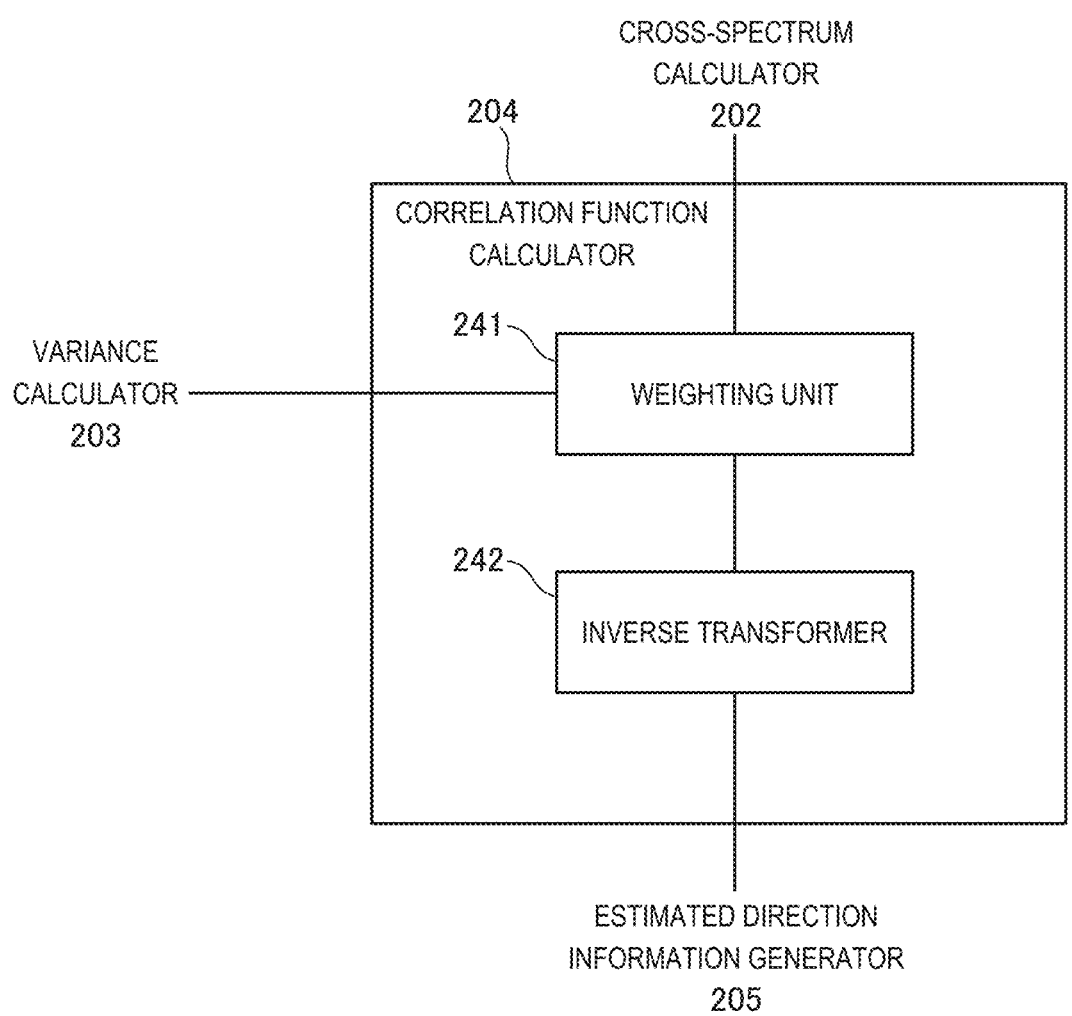
FIG. 3 is a block diagram showing the arrangement of a correlation function calculator of the wave source direction estimation apparatus according to the second example embodiment of the present invention.

FIG. 3 is a block diagram showing the arrangement of the correlation function calculator 204 of the wave source direction estimation apparatus 200 according to this example embodiment. The correlation function calculator 204 includes a weighting unit 241 and an inverse transformer 242.

(Weighting Unit 241)

The weighting unit 241 weights the cross-spectrum supplied from the cross-spectrum calculator 202 based on the variance supplied from the variance calculator 203, and transmits the weighted cross-spectrum to the inverse transformer 242.

If the variance is large, the possibility that the cross-spectrum contains information of the target sound source is low, so the weighting unit 241 decreases the value of the cross-spectrum. A typical method is a method of calculating a weight from the variance by using a mapping function prepared beforehand, and multiplies the cross-spectrum by the weight. In this method, a weighted cross-spectrum $WS_{12}(k,n)$ is calculated as follows:

$$WS_{12}(k,n) = G(k,n)S_{12}(k,n) \quad (15)$$

where $G(k,n)$ is the weight calculated based on the variance. $G(k,n)$ is calculated as follows:

$$G(k,n) \begin{cases} 0, & \frac{a}{V_{12}(k,n)} + b < 0 \\ 1, & \frac{a}{V_{12}(k,n)} + b > 1 \\ \frac{a}{V_{12}(k,n)} & \text{otherwise} \end{cases} \quad (16)$$

where $V_{12}(k,n)$ is the variance supplied from the variance calculator 203. It is also possible to use the corrected variance $VV_{12}(k,n)$ instead of $V_{12}(k,n)$. In addition, a and b are real numbers and satisfy a>0. A method of simply switching values based on threshold determination may also be used as follows:

$$G(k,n) = \begin{cases} 0, & V_{12}(k,n) \geq V_{th} \\ 1, & V_{12}(k,n) < V_{th} \end{cases} \quad (17)$$

where $V_{th}$ is the threshold and a positive real number. When calculating the gain, it is also possible to use variance functions represented by other forms, such as a linear mapping function, a higher-degree polynomial function, and a nonlinear function.

(Inverse Transformer 242)

The inverse transformer 242 inversely transforms the cross-spectrum supplied from the weighting unit 241. In this example embodiment, the transformer 201 uses Fourier transform, so a method of using inverse Fourier transform as inverse transform will be explained below. Letting $WS_{12}(k,n)$ be the cross-spectrum supplied from the weighting unit 241, a correlation function $s_{12}(\tau,n)$ obtained by inverse transform of $WS_{12}(k,n)$ is calculated as follows:

$$s_{12}(\tau,n) = \sum_{k=0}^{K-1} WS_{12}(k,n)\exp\left(j\frac{2\pi\tau k}{K}\right) \quad (18)$$

(Relative Delay Time Calculator 206)

The relative delay time calculator 206 obtains the relative delay time between the pair of microphones from the input microphone position information and sound source search target direction, and transmits a set of the relative delay time and the sound source search target direction to the estimated direction information generator 205. The relative delay time is a sound wave arrival time difference that is uniquely determined based on the microphone interval and the sound source direction. Letting c be the sonic velocity, d be the distance between the two microphones, and θ be the sound source direction, i.e., the sound incoming direction, a relative delay time τ(θ) with respect to the sound source direction θ is calculated by the following equation:

$$\tau(\theta) = \frac{d\cos\theta}{c} \quad (19)$$

The relative delay time is calculated for all sound source search target directions. For example, when the direction search range is every 10° from 0° to 90°, i.e., 0°, 10°, 20°, ..., 90°, 10 types of relative delay times are calculated. Then, pairs of the search target directions and the relative delay times are supplied to the estimated direction information generator 205.

(Estimated Direction Information Generator 205)

The estimated direction information generator 205 outputs the correspondence between the direction and the correlation value as estimated direction information, based on the correlation function supplied from the correlation function calculator 204 and the relative delay time supplied from the relative delay time calculator 206. Letting $s_{12}(\tau,n)$ be the correlation function and τ(θ) be the relative delay time, estimated direction information H(θ,n) is given by the following equation:

$$H(\theta,n) = s_{12}(\tau(\theta),n) \quad (20)$$

Since the correlation value is determined for each direction, if the correlation value is high, it is basically possible to determine that the possibility of the existence of the sound source in that direction is high.

The estimated direction information like this is used in various forms. For example, if the function has a plurality of peaks, it is likely that a plurality of sound sources each having a peak as the incoming direction exist. Accordingly, it is possible not only to simultaneously estimate the directions of these sound sources but also to estimate the number of sound sources.

It is also possible to determine the sound source existence possibility based on the difference between a peak and a nonpeak of the correlation function. If the difference between the peak and the nonpeak is large, it is possible to determine that the sound source existence possibility is high. At the same time, it is possible to determine that the reliability of the estimated direction is high. If it is possible to previously assume that the number of sound sources is one, a direction in which the correlation value is maximum can be output as the estimated direction information. In this case, the estimated direction information is not the correspondence between the direction and the correlation value but the direction itself.

Figure 4A:
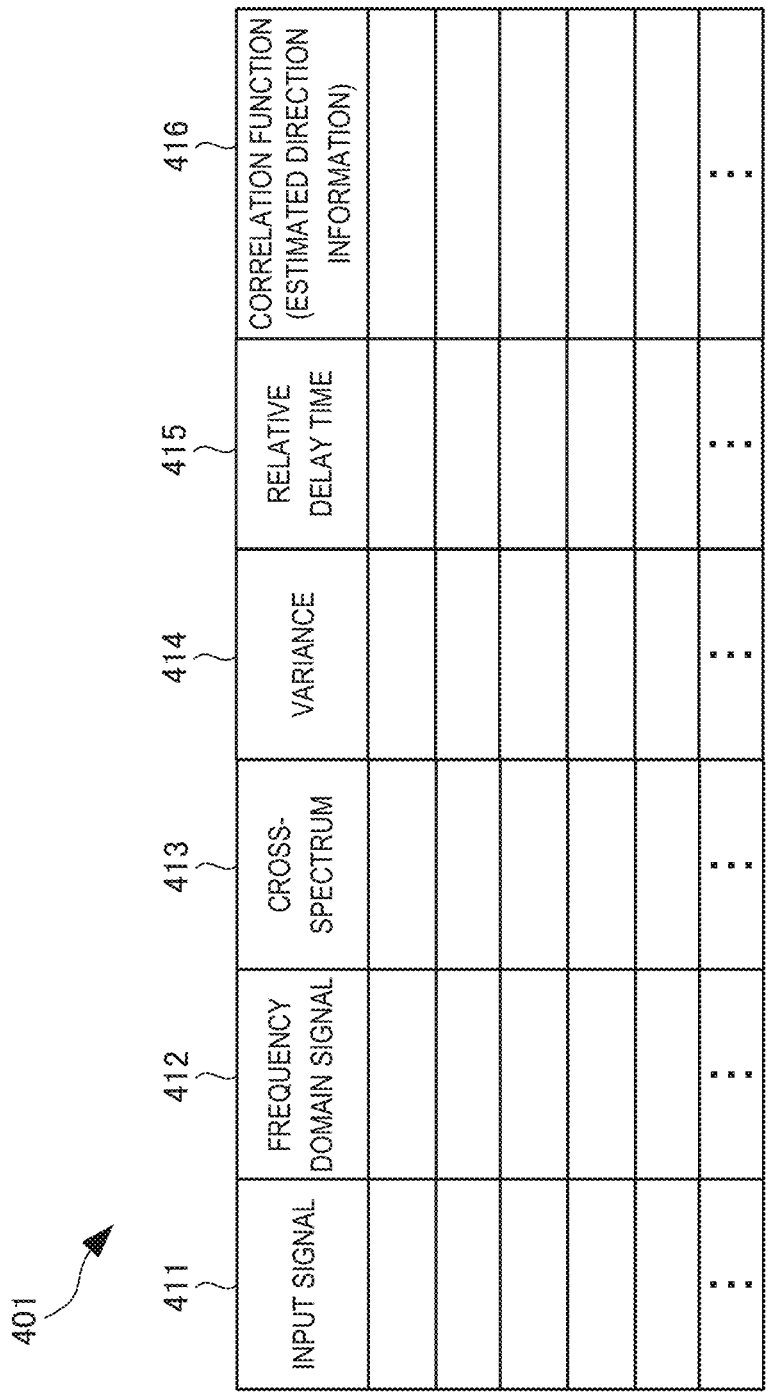
FIG. 4A is a view for explaining an example of a correlation function table of the wave source direction estimation apparatus according to the second example embodiment of the present invention.

FIG. 4A is a view for explaining an example of a correlation function table 401 of the wave source direction estimation apparatus 200 according to this example embodiment. The correlation function table 401 stores a frequency domain signal 412, a cross-spectrum 413, a variance 414, a relative delay time 415, and a correlation function 416 in association with an input signal 411. For example, the wave source direction estimation apparatus 200 calculates the correlation function 416 corresponding to the input signal 411 by referring to the correlation function table 401, thereby generating estimated direction information.

FIG. 4B is a view for explaining an example of a transform function table 402 of the wave source direction estimation apparatus 200 according to this example embodiment. The transform function table 402 stores a transform function 421 and an inverse transform function 422 in association with the input signal 411. For example, the wave source direction estimation apparatus 200 transforms the input signal 411 by referring to the transform function table 402, thereby calculating the frequency domain signal 412 and the cross-spectrum 413.

FIG. 4C is a view for explaining an example of a variance table 403 of the wave source direction estimation apparatus 200 according to this example embodiment. The variance table 403 stores a variance method 431 in association with a cross-spectrum 424. For example, the wave source direction estimation apparatus 200 calculates the variance 414 of the cross-spectrum 424 by referring to the variance table 403.

FIG. 5 is a view showing the hardware configuration of the wave source direction estimation apparatus 200 according to this example embodiment. A CPU (Central Processing Unit) 510 is a processor for controlling arithmetic operations, and implements the functional units of the wave source direction estimation apparatus 200 shown in FIGS. 2 and 3 by executing programs. A ROM (Read Only Memory) 520 stores fixed data such as initial data and programs, and other programs. A network interface 530 communicates with another apparatus across a network. Note that the CPU 510 is not limited to a single CPU, and may also be a plurality of CPUs or include an image processing GPU (Graphics Processing Unit). The network interface 530 desirably includes a CPU independent of the CPU 510, and writes or reads out transmission/reception data in or from an area of a RAM (Random Access Memory) 540. It is also desirable to install a DMAC (Direct Memory Access Controller) (not shown) for transferring data between the RAM 540 and a storage 550. Furthermore, an input/output interface 560 desirably includes a CPU independent of the CPU 510, and writes or reads out input/output data in or from an area of the RAM 540. Accordingly, the CPU 510 recognizes that data is received by or transferred to the RAM 540, and processes the data. Also, the CPU 510 prepares processing results in the RAM 540, and causes the network interface 530, the DMAC, or the input/output interface 560 to perform transmission or transfer later.

The RAM 540 is a random access memory which the CPU 510 uses as a temporary storage work area. In the RAM 540, an area for storing data necessary to implement this example embodiment is secured. An input signal 541 is a signal such as a sound input to the input terminals $20_1$ and $20_2$. A frequency domain signal 542 is a signal obtained by transforming the input signal by a predetermined transform method. A cross-spectrum 543 is calculated based on the frequency domain signal 542. A variance 544 is the variance of the cross-spectrum 543, which is calculated from the cross-spectrum 543. A relative delay time 545 is an arrival time difference between sound waves or the like, which is determined based on the microphone interval and the sound source direction. A correlation function 546 is calculated from the cross-spectrum 543 and the variance 544. These data are, e.g., data expanded from the correlation function table 401. Note that although not shown, the RAM 540 may also contain data expanded from the transform function table 402 and the variance table 403.

Input/output data 547 is data to be input/output via the input/output interface 560. Transmission/reception data 548 is data to be transmitted/received via the network interface 530. Also, the RAM 540 includes an application execution area 549 for executing various application modules.

The storage 550 stores a database and various parameters, or the following data or programs necessary to implement this example embodiment. That is, the storage 550 stores the correlation function table 401, the transform function table 402, and the variance table 403. The correlation function table 401 is a table for managing the relationship between the input signal 411 and the correlation function 416 and the like shown in FIG. 4A. The transform function table 402 is a table for managing the relationship between the input signal 411 and the transform function 421 and the like shown in FIG. 4B. The variance table 403 is a table for managing the relationship between the cross-spectrum 424 and the variance method 431 and the like shown in FIG. 4C. The storage 550 further stores a transform module 551, a cross-spectrum calculation module 552, a variance calculation module 553, a correlation function calculation module 554, a relative delay time calculation module 555, and an estimated direction information generation module 556.

The transform module 551 is a module for obtaining a frequency domain signal by transforming an input signal. The cross-spectrum calculation module 552 is a module for calculating a cross-spectrum based on the frequency domain signal. The variance calculation module 553 is a module for calculating the variance of the cross-spectrum. The correlation function calculation module 554 is a module for calculating a correlation function from the cross-spectrum and the variance. The relative delay time calculation module 555 is a module for calculating a relative delay time between a pair of microphones. The estimated direction information generation module 556 is a module for generating, as estimated direction information, the correspondence between a direction and a correlation value from the correlation function and the relative delay time. The CPU 510 reads out the modules 551 to 556 to the application execution area 549 of the RAM 540, and executes them. A control program 557 is a program for controlling the whole wave source direction estimation apparatus 200.

The input/output interface 560 interfaces input/output data with input/output devices. A display unit 561 and an operation unit 562 are connected to the input/output interface 560. A storage medium 564 can also be connected to the input/output interface 560. Furthermore, a speaker 563 as a sound output unit, a microphone as a sound input unit, or a GPS position determiner can also be connected. Note that in the RAM 540 and the storage 550 shown in FIG. 5, programs and data for versatile functions and other implementable functions of the wave source direction estimation apparatus 200 are not shown.

Figure 6:
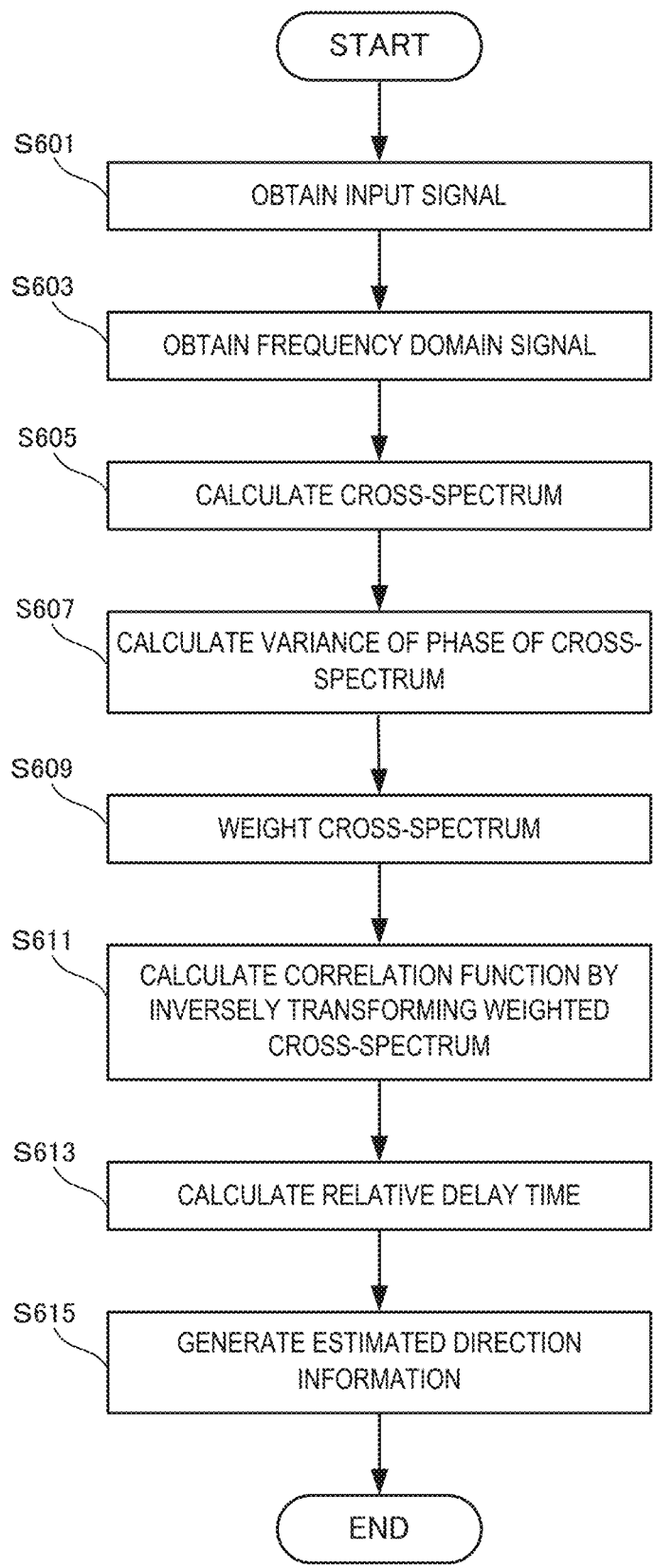
FIG. 6 is a flowchart for explaining the procedure of the wave source direction estimation apparatus according to the second example embodiment of the present invention.

FIG. 6 is a flowchart for explaining the procedure of the wave source direction estimation apparatus 200 according to this example embodiment. The CPU 510 executes this flowchart by using the RAM 540, thereby implementing the functional units of the wave source direction estimation apparatus 200 shown in FIGS. 2 and 3.

In step S601, the wave source direction estimation apparatus 200 obtains an input signal. In step S603, the wave source direction estimation apparatus 200 obtains a frequency domain signal by transforming the input signal. In step S605, the wave source direction estimation apparatus 200 calculates a cross-spectrum from the frequency domain signal. In step S607, the wave source direction estimation apparatus 200 calculates the variance of the phase of the cross-spectrum. In step S609, the wave source direction estimation apparatus 200 weights the cross-spectrum based on the calculated variance. In step S611, the wave source direction estimation apparatus 200 calculates a correlation function by inversely transforming the weighted cross-spectrum. In step S613, the wave source direction estimation apparatus 200 calculates a relative delay time. In step S615, the wave source direction estimation apparatus 200 generates estimated direction information from the correlation function and the relative delay time.

<Effects of this Example Embodiment>

According to this example embodiment, it is possible to accurately estimate the incoming direction of a target sound contained in an input signal, i.e., a direction in which a target object exists or the direction of a wave source. This example embodiment is effective when estimating a direction in which a target object exists by using a sound generated by the target object, in an environment in which an environmental noise level is high. Examples of the environmental noise are a downtown, a street, a road, and a place crowded with many people and automobiles. Examples of the target object are a person, an animal, an automobile, an airplane, a ship, a water scooter, and a drone (small-sized unmanned aircraft).

For example, it is possible to efficiently crack down on a suspicious person or object by detecting a suspicious automobile, ship, drone, or the like approaching an outdoor theme park, exhibition place, or the like, and by estimating the direction thereof. Also, the position of a target sound source can be specified by performing sound source direction estimation in a plurality of places. This makes it possible to accurately specify a position where a scream or a roar occurs or a position where a suspicious ship or drone appears, even in an environment in which an environmental noise level is high.

From the phase of the cross-spectrum, a time difference between sound waves arriving at two microphones, i.e., a sound source direction is obtained. Accordingly, it is possible to distinguish between a target sound and an environmental sound based on the value of the variance obtained from a time series of phases (in this example embodiment, the phases of (L−1) frames in the past). Since a change in direction of the target sound source with time is small, the variance of the phase decreases. Even when the generation time of the target sound is about a few seconds, if a phase is obtained for, e.g., every 10 milliseconds, the variance of the phase obtained from a few seconds is small. On the other hand, it is difficult to specify the direction of the environmental noise, so a change in direction with time increases, and the variance of the phase also increases. Since the variance is calculated for each frequency, a frequency band in which the target sound source exists can be specified.

Third Example Embodiment

Figure 7:
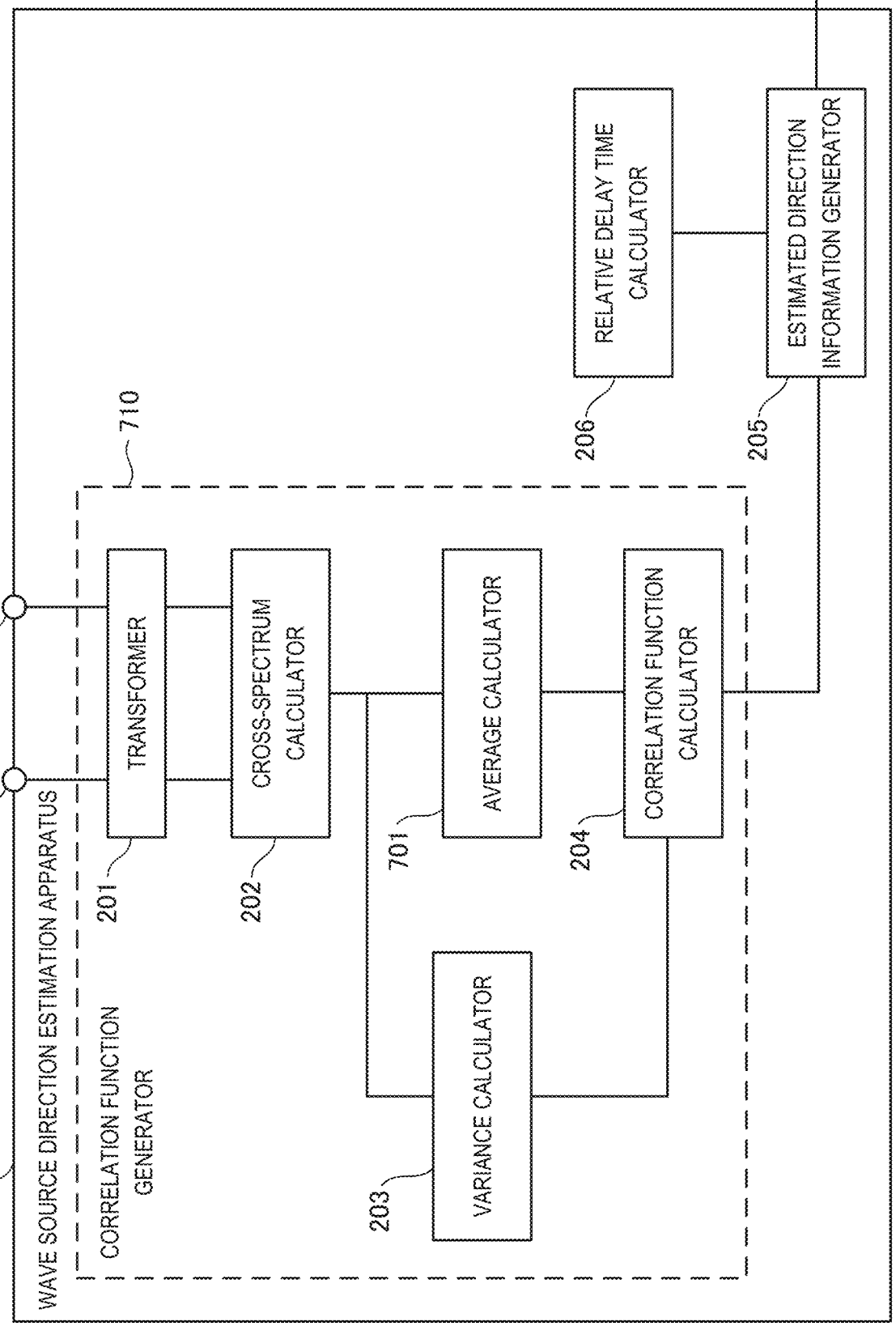
FIG. 7 is a block diagram for explaining the arrangement of a wave source direction estimation apparatus including a correlation function generator according to the third example embodiment of the present invention.

A wave source direction estimation apparatus according to the third example embodiment of the present invention will be explained below with reference to FIG. 7. FIG. 7 is a block diagram for explaining the arrangement of a wave source direction estimation apparatus 700 according to this example embodiment. The wave source direction estimation apparatus 700 according to this example embodiment differs from the abovementioned second example embodiment in that the apparatus 700 includes an average calculator 701. The rest of parts and operations are the same as the second example embodiment, so the same reference numerals denote the same parts and operations, and a detailed explanation thereof will be omitted. Note that a transformer 201, a cross-spectrum calculator 202, a variance calculator 203, a correlation function calculator 204, and the average calculator 701 form a correlation function generator 710.

(Average Calculator 701)

The average calculator 701 calculates the average of cross-spectra supplied from the cross-spectrum calculator 202, and transmits the average to the correlation function calculator 204. In this example embodiment, an example in which the average is calculated for each frequency bin from cross-spectra input in the past will be explained. This calculation may also be performed for each subband obtained by binding a plurality of frequency bins, instead of each frequency bin. Letting $S_{12}(k,n)$ be a cross-spectrum in a frequency bin k of the nth frame, an average cross-spectrum $SS_{12}(k,n)$ obtained from (L−1) frames in the past is calculated as follows:

$$SS_{12}(k, n) = \frac{1}{L}\sum_{m=0}^{L-1} S_{12}(k, n-m) \tag{21}$$

Leaky integration may also be used as follows:

$$SS_{12}(k,n)=(1-\alpha)SS_{12}(k,n-1)+\alpha S_{12}(k,n) \tag{22}$$

where $\alpha$ is a real number and satisfies $0<\alpha<1$.

<Effects of this Example Embodiment>

In this example embodiment, not a cross-spectrum but an average cross-spectrum is transmitted to the correlation function calculator 204. Compared to the second example embodiment, therefore, the peak position of a correlation function and the time fluctuation of estimated direction information become small for a target sound source having a small position fluctuation with time, so the accuracy of direction estimation improves. Especially when a sound generated by a target object continues, such as the traveling sound of an automobile, the flying sound of an airplane or a drone, or the sailing sound (screw sound) of a ship, the cross-spectrum averaging effect increases, so the correlation function peak position and the estimated direction information become clearer.

Fourth Example Embodiment

Figure 8:
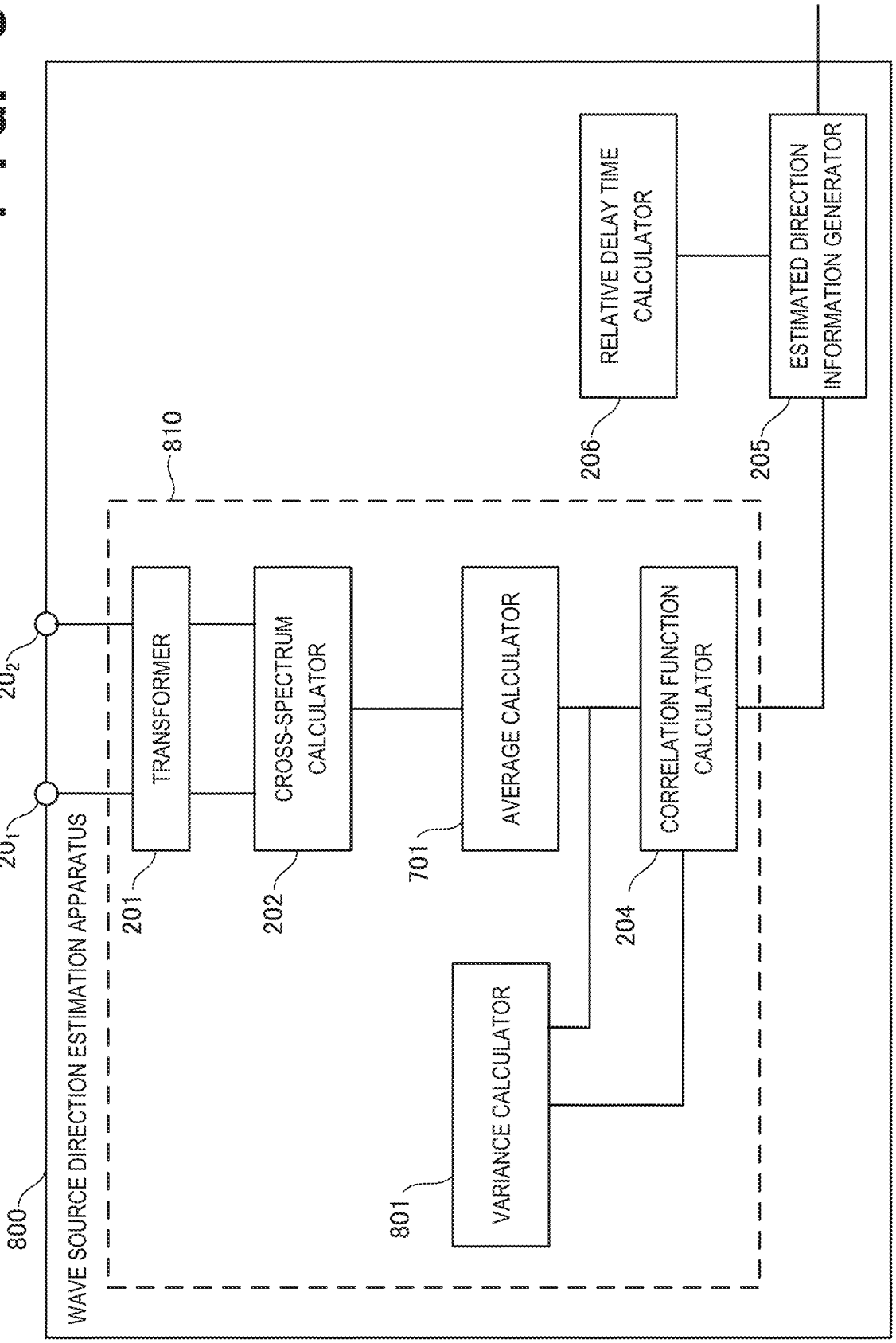
FIG. 8 is a block diagram for explaining the arrangement of a wave source direction estimation apparatus including a correlation function generator according to the fourth example embodiment of the present invention.

A wave source direction estimation apparatus according to the fourth example embodiment of the present invention will be explained below with reference to FIG. 8. FIG. 8 is a block diagram for explaining the arrangement of a wave source direction estimation apparatus 800 according to this example embodiment. The wave source direction estimation apparatus 800 according to this example embodiment differs from the abovementioned third example embodiment in that the apparatus 800 includes a variance calculator 801 instead of the variance calculator 203. The rest of parts and operations are the same as the third example embodiment, so the same reference numerals denote the same parts and operations, and a detailed explanation thereof will be omitted. Note that a transformer 201, a cross-spectrum calculator 202, the variance calculator 801, an average calculator 701, and a correlation function calculator 204 form a correlation function generator 810.

(Variance Calculator 801)

The variance calculator 801 calculates a variance by using the average cross-spectrum supplied from an average calculator 301, and transmits the variance to the correlation function calculator 204. The difference from the third example embodiment is that the variance is calculated by using not the cross-spectrum but the average cross-spectrum. Especially when calculating a variance or a standard deviation known in the directional statistics, the calculation of the circular average can be omitted in the calculation process. Letting $SS_{12}(k,n)$ be the average cross-spectrum, a variance $V_{12}(k,n)$ is calculated as follows when using the circular variance in the calculation of "the variance of the phase of a cross-spectrum":

$$V_{12}(k,n) = 1 - |SS_{12}(k,n)| \tag{23}$$

The following variance as a modification of equation (23) is also effective:

$$V_{12}(k,n) = 1 - SS_{12}(k,n)^2 \tag{24}$$

When using the circular standard deviation, the variance $V_{12}(k,n)$ is calculated as follows:

$$V_{12}(k,n) = \sqrt{-2\ln|SS_{12}(k,n)|} \tag{25}$$

<Effects of this Example Embodiment>

In this example embodiment, the variance calculator calculates the variance by using the average cross-spectrum calculated by the average cross-spectrum calculator. This obviates the need for the calculation of the average cross-spectrum in the variance calculator. Accordingly, the variance can be calculated with a calculation amount smaller than that in the third example embodiment.

Fifth Example Embodiment

Figure 9:
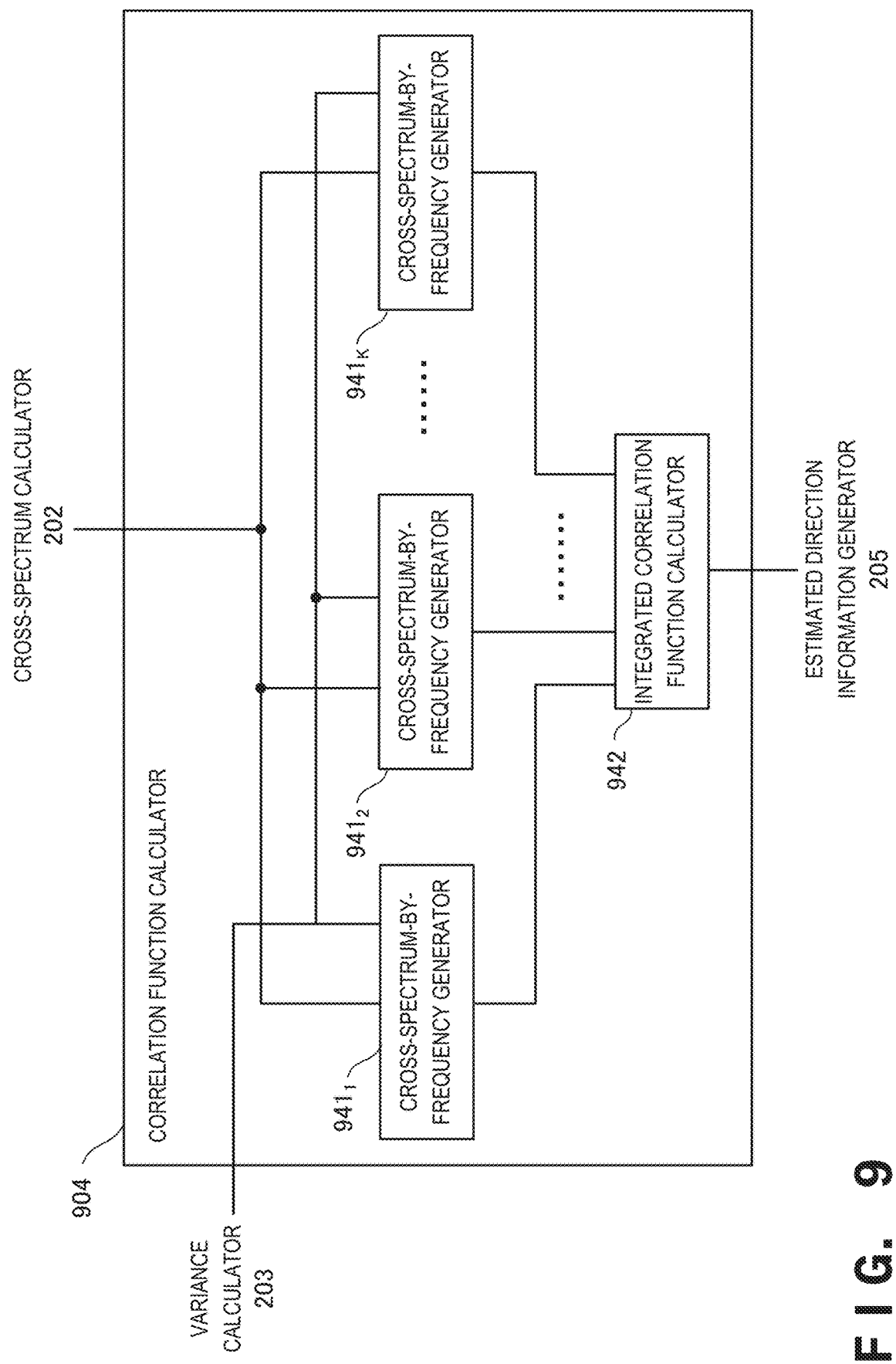
FIG. 9 is a block diagram for explaining the arrangement of a correlation function calculator of a wave source direction estimation apparatus according to the fifth example embodiment of the present invention.

A wave source direction estimation apparatus according to the fifth example embodiment of the present invention will be explained below with reference to FIGS. 9 to 12D. The wave source direction estimation apparatus according to this example embodiment differs from the wave source direction estimation apparatus of the abovementioned second example embodiment in that the apparatus of the fifth example embodiment includes a correlation function calculator 904 instead of the correlation function calculator 204. FIG. 9 is a block diagram for explaining the arrangement of the correlation function calculator 904 according to this example embodiment. Compared to the correlation function calculator 204 of the second example embodiment, the correlation function calculator 904 according to this example embodiment includes cross-spectrum-by-frequency generators $941_1, 941_2, \ldots, 941_K$ and an integrated correlation function calculator 942, instead of the weighting unit 241 and the inverse transformer 242. The rest of parts and operations are the same as the second example embodiment, so the same reference numerals denote the same parts and operations, and a detailed explanation thereof will be omitted.

FIG. 9 is a block diagram of the correlation function calculator 904. The correlation function calculator 904 includes the cross-spectrum-by-frequency generators $941_1, 941_2, \ldots, 941_K$ and the integrated correlation function calculator 942. The cross-spectrum-by-frequency generators $941_1, 941_2, \ldots, 941_K$ calculate a cross-spectrum corresponding to each frequency k of a cross-spectrum $S_{12}(k,n)$ supplied from a cross-spectrum calculator 202, by using $S_{12}(k,n)$ and a variance $p(k,n)$ supplied from a variance calculator 203, and transmits the cross-spectrum as a cross-spectrum-by-frequency to the integrated correlation function calculator 942. The cross-spectrum-by-frequency is generated in order to calculate a correlation function for each frequency component. That is, the cross-spectrum-by-frequency is calculated in order to obtain a correlation function (called a correlation-function-by-frequency) corresponding to a given frequency k in the succeeding stage.

The correlation function calculator 904 calculates an integrated correlation function based on the cross-spectrum-by-frequency supplied from the integrated correlation function calculator 942 and the cross-spectrum-by-frequency generators $941_1, 941_2, \ldots, 941_K$, and transmits the integrated correlation function to the estimated direction information generator 205.

The cross-spectrum-by-frequency generator $941_k$ for calculating the cross-spectrum-by-frequency of a given frequency k will be explained in detail below with reference to FIG. 10. After that, details of the integrated correlation function calculator 942 will be explained with reference to FIG. 11.

<Cross-Spectrum-by-Frequency Generator $941_k$>

Figure 10:
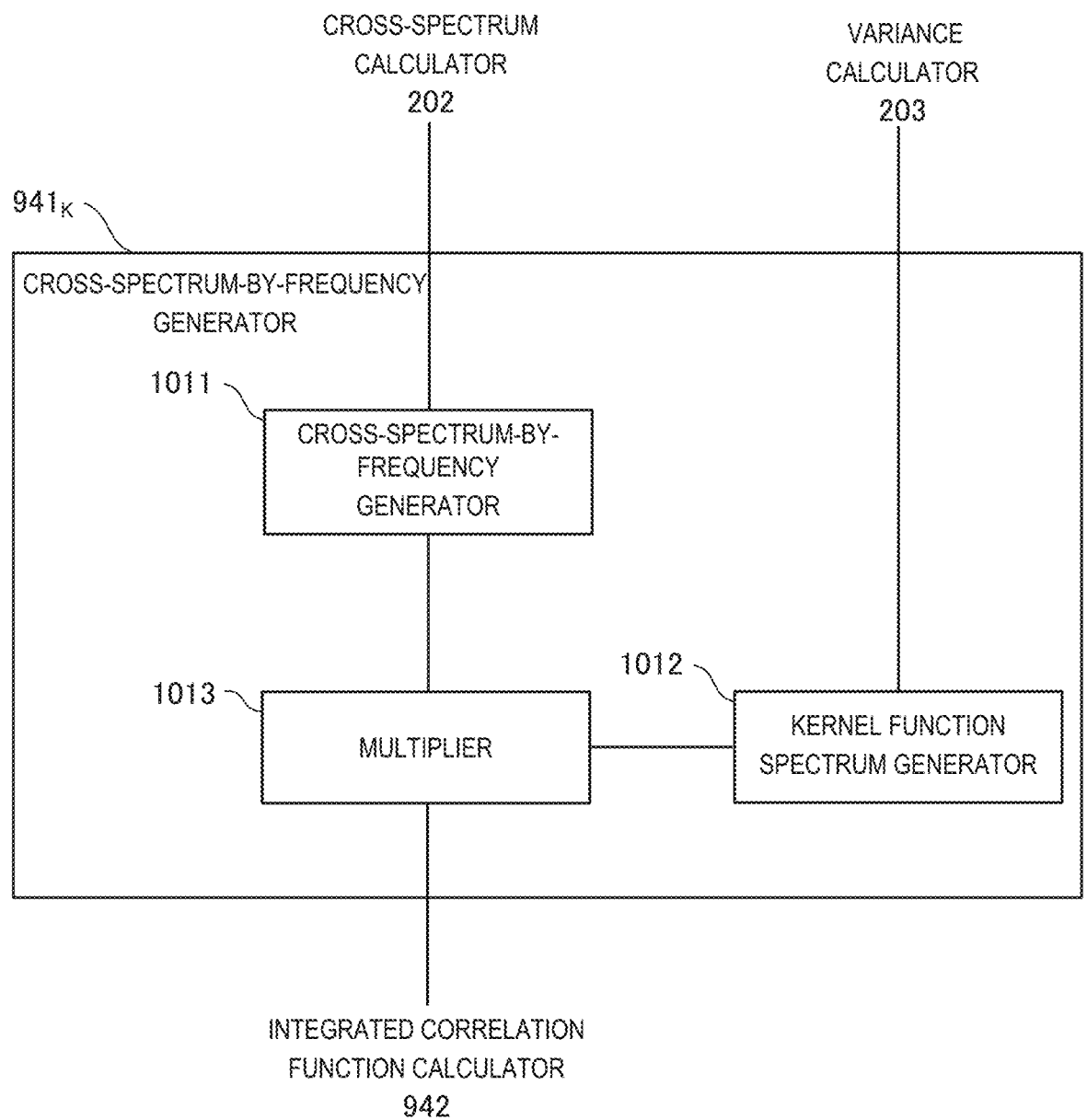
FIG. 10 is a block diagram for explaining the arrangement of cross-spectrum-by-frequency generation of the wave source direction estimation apparatus according to the fifth example embodiment of the present invention.

FIG. 10 is a block diagram of the cross-spectrum-by-frequency generator $941_k$. The cross-spectrum-by-frequency generator $941_k$ includes a cross-spectrum-by-frequency generator 1011, a kernel function spectrum generator 1012, and a multiplier 1013. The cross-spectrum-by-frequency generator $941_k$ calculates a cross-spectrum corresponding to the frequency k of the cross-spectrum $S_{12}(k,n)$ supplied from the cross-spectrum calculator 202, by using $S_{12}(k,n)$ and the variance supplied from the variance calculator 203, and transmits the cross-spectrum-by-frequency to the integrated correlation function calculator 942.

(Cross-Spectrum-by-Frequency Generator 941)

The cross-spectrum-by-frequency generators $941_1, 941_2, \ldots, 941_K$ calculate a cross-spectrum corresponding to each frequency k of the cross-spectrum $S_{12}(k,n)$ supplied from the cross-spectrum calculator 202 by using $S_{12}(k,n)$, and transmits the cross-spectrum as a cross-spectrum-by-frequency to the multiplier 1013. The cross-spectrum-by-frequency is calculated in order to calculate a correlation function for each frequency component. That is, the cross-spectrum-by-frequency is calculated in order to obtain a correlation function (called a correlation-function-by-frequency) corresponding to a given frequency k in the succeeding stage.

Next, details of the cross-spectrum-by-frequency generator $941_k$ for calculating the cross-spectrum-by-frequency of a given frequency k will be explained. When calculating a cross-spectrum-by-frequency based on the cross-spectrum $S_{12}(k,n)$ of the frequency k, the cross-spectrum-by-frequency generator $941_k$ separately obtains a phase component and an amplitude component in advance, and integrates them after that. Letting $U_k(w,n)$ be the cross-spectrum-byfrequency of the frequency k, $|U_k(w,n)|$ be the amplitude component, and $\arg(U_k(w,n))$ be the phase component, the following relationship holds:

$$U_k(w,n)=|U_k(w,n)|\exp(j\cdot\arg(U_k(w,n))) \quad (26)$$

where w represents the frequency and is an integer from 0 (inclusive) to W−1 (inclusive). A method of obtaining the amplitude component $|U_k(w,n)|$ and the phase component $\arg(U_k(w,n))$ of the cross-spectrum-by-frequency from the cross-spectrum $S_{12}(k,n)$ of the frequency k will be explained below.

1.0 is used as the amplitude component $|U_k(w,n)|$ for a frequency that is an integral multiple of k. On the other hand, the phase component of a frequency that is a non-integral multiple of the frequency k is set at zero. When this is expressed by a numerical expression, the amplitude component $|U_k(w,n)|$ is given as follows:

$$|U_k(w,n)| = \begin{cases} 1, & \text{if } w = p \cdot k \\ 0, & \text{if } w \neq p \cdot k \end{cases} \quad (27)$$

where p is an integer from 1 (inclusive) to P (inclusive). Since information that is important when performing wave source direction estimation is the phase component, an appropriate constant is used as the amplitude component as described above. It is also possible to use $|S_{12}(k,n)|$ instead of 1.0. That is, the amplitude component $|U_k(w,n)|$ may also be obtained by the following equation:

$$|U_k(w,n)| = \begin{cases} |S_{12}(k,n)|, & \text{if } w = p \cdot k \\ 0, & \text{if } w \neq p \cdot k \end{cases} \quad (28)$$

For a frequency as an integral multiple of k, a value obtained by multiplying the cross-spectrum $S_{12}(k,n)$ of the frequency k by a constant is used as the phase component $\arg(U_k(w,n))$. For example, as the phase components of frequencies k, 2 k, 3 k, and 4 k, values obtained by integrally multiplying the phase component $\arg(S_{12}(k,n))$ of the frequency k by the same magnification, i.e., $\arg(S_{12}(k,n))$, 2 $\arg(S_{12}(k,n))$, 3 $\arg(S_{12}(k,n))$, and 4 $\arg(S_{12}(k,n))$ are used. On the other hand, the phase component of a frequency that is a non-integral multiple of the frequency k is set at zero. Accordingly, the phase component $\arg(U_k(w,n))$ of the cross-spectrum-by-frequency corresponding to the frequency k is calculated as follows:

$$\arg(U_k(w,n)) = \begin{cases} p \cdot \arg(S_{12}(k,n)), & \text{if } w = p \cdot k \\ 0, & \text{if } w \neq p \cdot k \end{cases} \quad (29)$$

where p is an integer from 1 (inclusive) to P (inclusive). Also, P is an integer larger than 1.

The amplitude component and the phase component obtained by the above method are integrated by using equation (26) described earlier, thereby obtaining the cross-spectrum-by-frequency $U_k(w,n)$ of the frequency k.

The method explained above obtains the cross-spectrum-by-frequency by separately obtaining the amplitude component and the phase component. However, the cross-spectrum-by-frequency $U_k(w,n)$ can be obtained without obtaining the amplitude component and the phase component, by using the power of the cross-spectrum as indicated by the following equation:

$$U_k(w,n) = \begin{cases} \left(\dfrac{S_{12}(k,n)}{|S_{12}(k,n)|}\right)^p, & \text{if } w = p \cdot k \\ 0, & \text{if } w \neq p \cdot k \end{cases} \quad (30)$$

(Kernel Function Spectrum Generator 1012)

The kernel function spectrum generator 1012 obtains a kernel function spectrum based on the variance supplied from the variance calculator 203, and outputs the kernel function spectrum to the multiplier 1013. The kernel function spectrum is obtained by performing Fourier transform on a kernel function, and calculating the absolute value of the result. It is also possible to calculate the square instead of the absolute value. The square of the absolute value may also be used. This example embodiment will be explained by letting G(w) be the kernel function spectrum, and g(t) be the kernel function. A Gaussian function is used as the kernel function. This Gaussian function is given by the following equation:

$$g(\tau) = g_1 \exp\left(-\frac{(\tau-g_2)^2}{2g_3^2}\right) \quad (31)$$

where $g_1$, $g_2$, and $g_3$ are positive real numbers. $g_1$ controls the magnitude of the Gaussian function, $g_2$ controls the peak position of the Gaussian function, and $g_3$ controls the spread of the Gaussian function. $g_3$ that adjusts the spread of the Gaussian function is particularly important because it has a large influence on the peak sharpness of a correlation-function-by-frequency. As shown in equation (31), the spread of the Gaussian function increases as $g_3$ increases.

It is also possible to use the following logistic function:

$$g(\tau) = \frac{\exp\left(-\dfrac{\tau-g_4}{g_5}\right)}{g_5\left(1+\exp\left(-\dfrac{\tau-g_4}{g_5}\right)\right)^2} \quad (32)$$

where $g_1$ and $g_2$ are positive real numbers. The logistic function has a shape similar to that of the Gaussian function, but has a tail longer than that of the Gaussian function. Like $g_3$ in the Gaussian function, $g_5$ that adjusts the spread of the logistic function is particularly an important parameter that has a large influence on the peak sharpness of a correlation-function-by-frequency. It is also possible to use a cosine function or a uniform function.

Of the parameters of the kernel function, $g_3$ and $g_5$ having influence on the spread of the kernel function are determined based on the variance supplied from the variance calculator 203. In this example embodiment, these parameters are called spread control parameters and expressed by q(k,n). Therefore, $q_3=q(k,n)$ when the kernel function is the Gaussian function. If the variance is small, the parameter is changed such that the peak of the correlation-function-by-frequency sharpens and its tail narrows. Accordingly, the spread control parameter is decreased.

The basic method of calculating the spread control parameter is a method of converting the value of the variance into the spread control parameter by using a preset mapping function. For example, the spread control parameter is set at a large value (e.g., 10) if the variance is larger than a given threshold, and is set at a small value (e.g., 0.01) if the variance is smaller than the threshold. In this case, letting $V_{12}(k,n)$ be the variance and $p_{th}$ be the threshold, the spread control parameter $q(k,n)$ in the frequency bin k of the nth frame is calculated as follows:

$$q(k, n) = \begin{cases} q_1, & V_{12}(k, n) \geq p_{th} \\ q_2, & V_{12}(k, n) < p_{th} \end{cases} \quad (33)$$

where $q_1$ and $q_2$ are positive real numbers and satisfy $q_1 > q_2$. This calculation may also be performed by using a linear function as follows:

$$q(k, n) = \begin{cases} q_3 V_{12}(k, n) + q_4, & q_3 V_{12}(k, n) + q_4 > 0 \\ 0, & \text{otherwise} \end{cases} \quad (34)$$

where $q_3$ and $q_4$ are real numbers and satisfy $q_3 > 0$. It is also possible to use variance functions represented by other forms, such as a linear mapping function, a higher-degree polynomial function, and a nonlinear function in the calculation of the variance. The variance may also directly be used as the spread control parameter (this is equivalent to $q(k,n)=V_{12}(k,n)$).

The function for obtaining the spread control parameter may also be the function of the frequency k, instead of the function of the variance. An example is a function that decreases as the frequency rises. As a typical example, an example using the reciprocal of k will be explained. In this case, the spread control parameter $q(k,n)$ is calculated by using the following function, instead of equation (33):

$$q(k, n) = \begin{cases} \dfrac{q_1}{k}, & V_{12}(k, n) \geq p_{th} \\ \dfrac{q_2}{k}, & V_{12}(k, n) < p_{th} \end{cases} \quad (35)$$

Also, the spread control parameter $q(k,n)$ is calculated by using the following function, instead of equation (34):

$$q(k, n) = \begin{cases} \dfrac{q_3 p(k, n) + q_4}{k}, & q_3 p(k, n) + q_4 > 0 \\ 0, & \text{otherwise} \end{cases} \quad (36)$$

(Multiplier 1013)

The multiplier 1013 calculates the product of the cross-spectrum-by-frequency supplied from the cross-spectrum-by-frequency generator 1011 and the kernel function spectrum supplied from the kernel function spectrum generator 1012, and transmits a new frequency cross-spectrum obtained by the calculation to the integrated correlation function calculator 942. Letting $U_k(w,n)$ be the cross-spectrum-by-frequency supplied from the cross-spectrum-by-frequency generator 1011, and $G(w)$ be the kernel function spectrum supplied from the kernel function spectrum generator 1012, a new cross-spectrum-by-frequency $UM_k(w,n)$ obtained by the calculation is calculated as follows:

$$UM_k(w,n)=G(w)U_k(w,n) \quad (37)$$

<Integrated Correlation Function Calculator>

Figure 11:
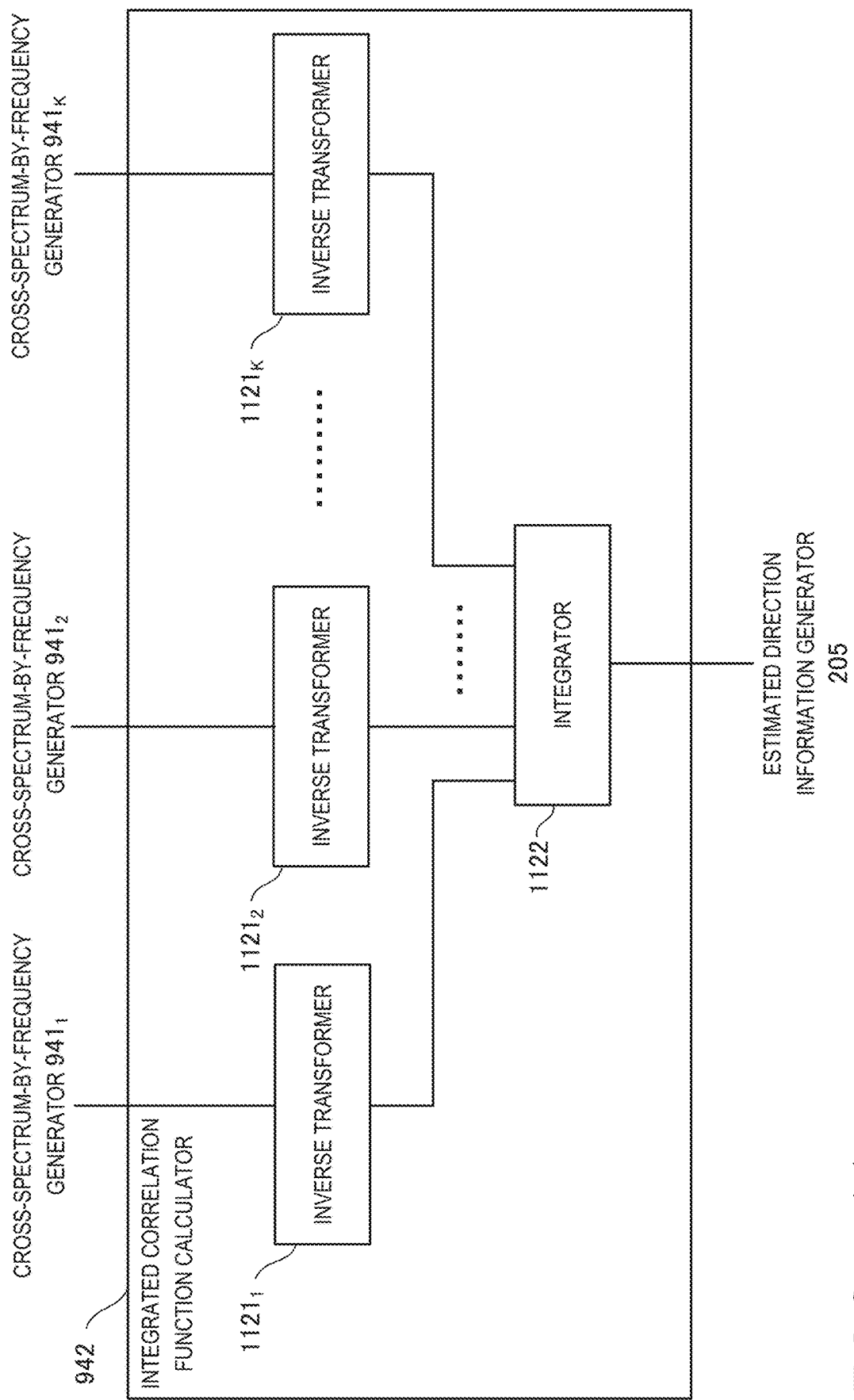
FIG. 11 is a block diagram for explaining the arrangement of an integrated correlation function calculator of the wave source direction estimation apparatus according to the fifth example embodiment of the present invention.

FIG. 11 is a block diagram of the integrated correlation function calculator 942. The integrated correlation function calculator 942 includes inversion transformers $1121_k$, $1121_2$, ..., $1121_K$, and an integrator 1122.

The inverse transformers $1121_k$, $1121_2$, ..., $1121_K$ inversely transform the cross-spectra-by-frequencies supplied from the cross-spectrum-by-frequency generators $941_1, 941_2, \ldots, 941_K$, and transmit the results as correlation-functions-by-frequencies to the integrator 1122. In this example embodiment, the transformer 201 uses Fourier transform, so a method using inverse Fourier transform in inverse transformation will be explained. Letting $UM_k(w,n)$ be the cross-spectrum-by-frequency supplied from the cross-spectrum-by-frequency generator $941_k$, a correlation-function-by-frequency $u_k(\tau,n)$ obtained by inverse transformation of $UM_k(w,n)$ is calculated as follows:

$$u_k(\tau, n) = \sum_{w=0}^{W-1} UM_k(w, n)\exp\left(j\frac{2\pi\tau w}{W}\right) \quad (38)$$

The integrator 1122 integrates the correlation-functions-by-frequencies supplied from the inverse transformers $1121_1, 1121_2, \ldots, 1121_K$, and transmits the result as an integrated correlation function to the estimated direction information generator 205. One correlation function is obtained by mixing or superposing the plurality of separately obtained correlation-functions-by-frequencies. When using a simple sum as the integration method, the integrator 1122 calculates the sum total of the correlation-functions-by-frequencies. Letting $u(\tau,n)$ be the integrated correlation function, $u(\tau,n)$ is calculated as follows:

$$u(\tau, n) = u_0(\tau, n) + u_1(\tau, n) + \cdots + u_{K-1}(\tau, n) = \sum_{k=0}^{K-1} u_k(\tau, n) \quad (39)$$

An infinite product may also be used instead of the sum total. In this case, $u(\tau,n)$ is calculated as follows:

$$u(\tau, n) = u_0(\tau, n) \cdot u_1(\tau, n) \cdots u_{K-1}(\tau, n) = \prod_{k=0}^{K-1} u_k(\tau, n) \quad (40)$$

If a frequency at which a target sound exists is known or a frequency at which the power of a target sound is high is known, the integrated correlation function may also be obtained by using only a correlation-function-by-frequency corresponding to the frequency. It is also possible to control the degree of influence of the correlation-function-by-frequency in integration, in the form of weighting. For example, letting $\Omega$ be a set of frequencies at which a target sound exists, $u(\tau,n)$ is calculated as follows when obtaining $u(\tau,n)$ by selecting a frequency:

$$u(\tau, n) = \sum_{k \in \Omega} u_k(\tau, n) \quad (41)$$

When using weighting, $u(\tau,n)$ is calculated as follows.

$$u(\tau, n) = \sum_{k \in \Omega} a \cdot u_k(\tau, n) + \sum_{k \notin \Omega} b \cdot u_k(\tau, n) \quad (42)$$

where a and b are real numbers and satisfy a>b>0. As described above, when integration is performed by selectively using a correlation-function-by-frequency of a frequency at which a target sound exists, a correlation function in which the influence of a non-target sound such as noise is small can be generated, so the direction estimation accuracy improves.

<Explanation of Cross-Spectrum-by-Frequency>

Figure 12A:
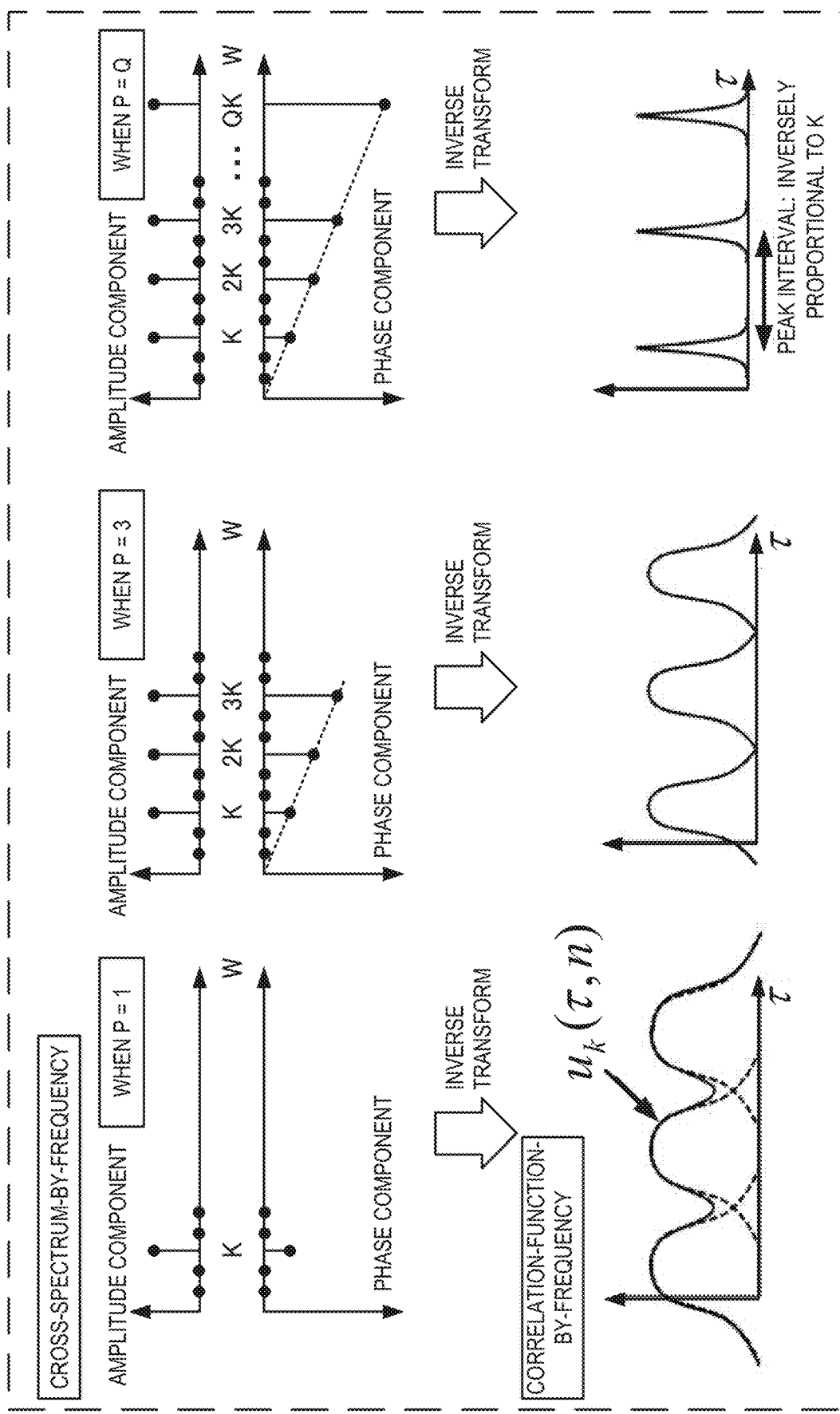
FIG. 12A is a view for explaining a cross-spectrum-by-frequency and a correlation-function-by-frequency calculated by the wave source direction estimation apparatus according to the fifth example embodiment of the present invention.

When calculating the cross-spectrum-by-frequency by the above method, the peak of the correlation-function-by-frequency obtained by inversely transforming the cross-spectrum-by-frequency sharpens, and the peak position of the correlation function clarifies. In the present invention in which wave source direction estimation is performed based on the peak position of the correlation function, the accuracy of sound source direction estimation improves if the peak sharpens. In addition, as the value of P increases, i.e., as the component of a frequency that is an integral multiple of k increases, the peak of the correlation function sharpens. FIG. 12A shows this. Referring to FIG. 12A, Q is an integer larger than 3. When P=1, i.e., when there is only one phase component, a correlation function obtained by inversely transforming this phase component has an unclear peak position. As shown in FIG. 12A, the peak of the correlation function sharpens when P increases.

Accordingly, a cross-spectrum-by-frequency obtained by the cross-spectrum-by-frequency generator 1011 is defined, based on the cross-spectrum of a given frequency k, as "a cross-spectrum obtained by allocating a p-fold value of the phase component $\arg(S_{12}(k,n))$ of the frequency k to the phase component of a frequency pk as an integral multiple of the frequency k". In this definition, p is an integer of 1 or more. That is, the cross-spectrum-by-frequency is defined such that the phase component $\arg(U_k(w,n))$ satisfies at least the following equation:

$$\arg(U_k(w,n))=p\cdot\arg(S_{12}(k,n)), \text{ if } w=p\cdot k \quad (43)$$

In addition, p is limited to two or more, e.g., p=1 and 2, p=1 and 3, or p=2 and 3. When p is only 1, a cross-spectrum-by-frequency is generated by extracting only the component of the frequency k, but the direction estimation accuracy is equal to those of the background arts, so a high direction estimation accuracy cannot be achieved. Note that as explained with reference to FIG. 12A, when the number of p's increases like p=1, 2, 3, 4, . . . , i.e., when the allocation to the phase component of the frequency pk increases, the peak of the correlation-function-by-frequency sharpens, so the accuracy of direction estimation improves.

<Explanation of Effects of Multiplying Cross-Spectrum-by-Frequency by Kernel Function Spectrum>

Figure 12B:
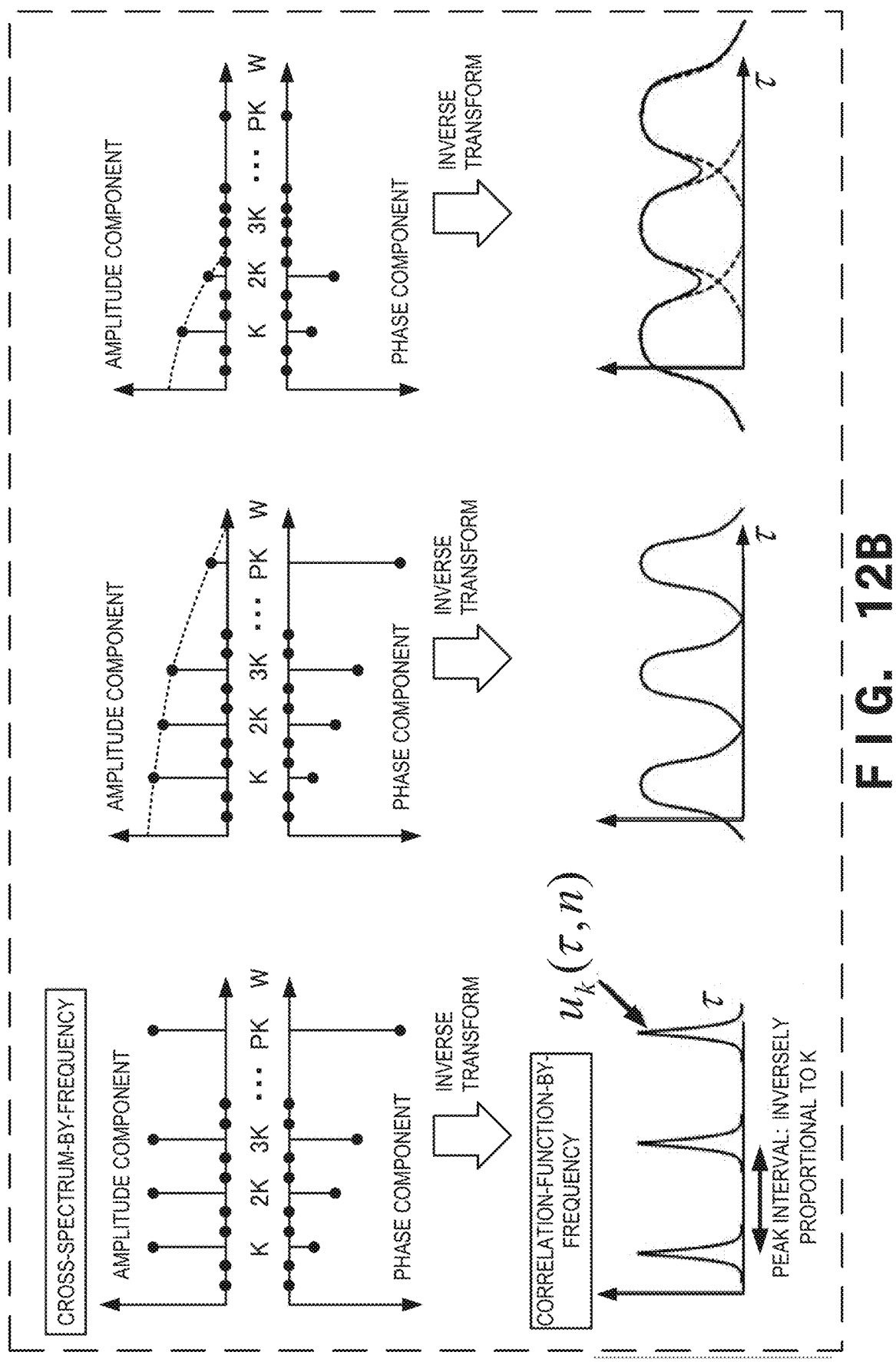
FIG. 12B is a view for explaining the relationship between a correlation-function-by-frequency and a cross-spectrum-by-frequency multiplied by a kernel function spectrum by the wave source direction estimation apparatus according to the fifth example embodiment of the present invention.

The shape of the correlation-function-by-frequency can be changed by multiplying the cross-spectrum-by-frequency by the kernel function spectrum. FIG. 12B shows the relationship between the cross-spectrum-by-frequency multiplied by the kernel function spectrum, and the correlation-function-by-frequency. For comparison, FIG. 12B also shows a cross-spectrum-by-frequency before being multiplied by the kernel function spectrum. As shown in the left-side view of FIG. 12B, when the cross-spectrum-by-frequency is not multiplied by the kernel function spectrum, components exist to higher frequencies, so the peak of the correlation-function-by-frequency sharpens. On the other hand, as shown in the middle view and the right-side view of FIG. 12B, when the cross-spectrum-by-frequency is multiplied by the kernel function spectrum, components in higher frequencies decade, so the sharpness of the peak of the correlation-function-by-frequency decreases. That is, as the peak of the kernel function spectrum sharpens (as the tail of the kernel function spectrum narrows), the sharpness of the peak of the correlation-function-by-frequency decreases. Also, as shown in the right-side view of FIG. 12B, when the tail of the correlation-function-by-frequency largely spreads, the tail of an adjacent crest overlaps, so a correlation-function-by-frequency having a shallow trough is obtained.

The relationship between the shape of the kernel function and that of the kernel function spectrum will be explained in more detail below. The shapes have an inverse relationship due to the properties of Fourier transform. As the peak of the kernel function sharpens and its tail narrows, the peak of the kernel function spectrum flattens and its tail widens. When taking account of the relationship with $g_3$ for adjusting the spread of the Gaussian function as well, if $g_3$ increases, the spread of the Gaussian function increases, but the spread of its spectrum decreases.

Figure 12C:
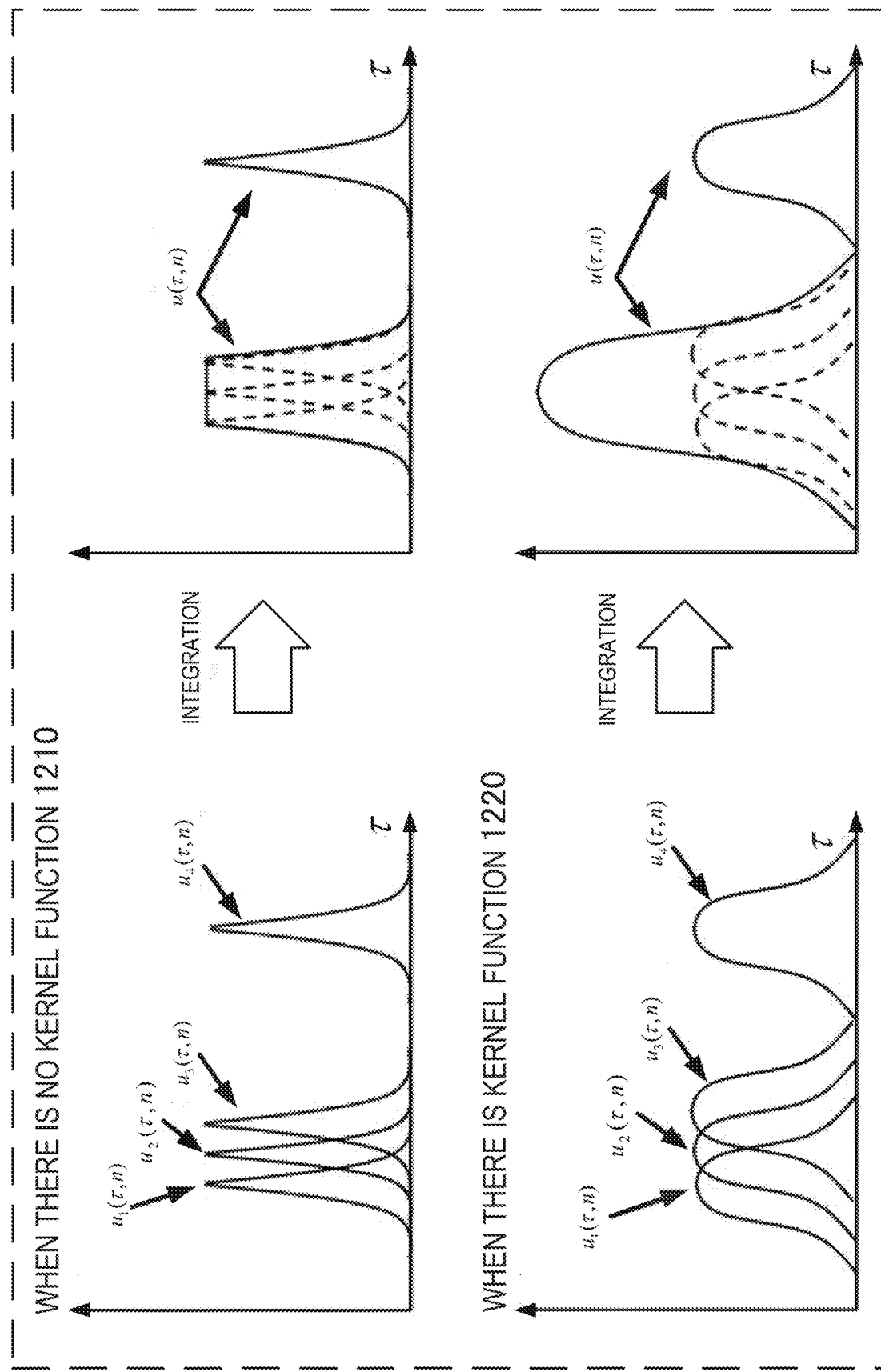
FIG. 12C is a view for explaining the relationship between the presence/absence of a kernel function and an integrated correlation function in the wave source direction estimation apparatus according to the fifth example embodiment of the present invention.

The effect of controlling the size of the correlation-function-by-frequency by the kernel function will be explained with reference to FIG. 12C. FIG. 12C is a view showing the relationship between the presence/absence of the kernel function and the integrated correlation function. When there is no kernel function as shown in FIG. 12C (1210), the peak positions of correlation-functions-by-frequencies $u_1(\tau,n)$ to $u_3(\tau,n)$ are close, but no large peak can be formed by integration because the widths of $u_1(\tau,n)$ to $u_3(\tau,n)$ are small. Consequently, the peak position is unclear. On the other hand, when there is a kernel function as shown in FIG. 12C (1220), the widths of the correlation-functions-by-frequencies are large, so $u_1(\tau,n)$ to $u_3(\tau,n)$ can form a large peak by integration. This makes the peak position clearer than that when there is no kernel function (1210).

Another effect of controlling the size of the correlation-function-by-frequency by the kernel function will be explained below with reference to FIG. 12D. FIG. 12D shows the relationship between the difference between the widths of kernel function spectra, and the integrated correlation function. As shown in the right-side view of FIG. 12B, when using a wide kernel function spectrum, the periodicity of the correlation function forms correlation-functions-by-frequencies having shallow troughs. Accordingly, as indicated by 1230 in FIG. 12D, when the correlation-functions-by-frequencies having shallow troughs are integrated, an integrated correlation function having a shallow trough, i.e., having an inconspicuous peak is generated. On the other hand, as shown in the middle view of FIG. 12B, when using a narrow kernel function spectrum, correlation-functions-by-frequencies having troughs deeper than those shown in the right-side view of FIG. 12B are formed. As indicated by 1240 in FIG. 12D, therefore, an integrated correlation function having a clear peak is generated.

This example embodiment calculates the product of a kernel function spectrum obtained by Fourier transform of a kernel function, and a cross-spectrum-by-frequency. This can also be implemented by a time domain due to the properties of Fourier transform. It is also possible to form "a convolution unit" for convoluting a kernel function, instead of the cross-spectrum-by-frequency calculator, in the output stage of the inverse transformer 1121$_k$ of the integrated correlation function calculator 942, and convolute a kernel function in the correlation-function-by-frequency supplied from the inverse transformer 1121$_k$. Since, however, a convolutional operation requires a large calculation amount, it is more efficient to calculate the product by a frequency domain as in this example embodiment.

23

<Effects of this Example Embodiment>

According to this example embodiment, the peak of a correlation-function-by-frequency obtained by inversely transforming a cross-spectrum-by-frequency sharpens, so the peak position of a correlation function clarifies. In this example embodiment that performs wave sound direction estimation based on the peak position of a correlation function, the accuracy of sound source direction estimation improves. Also, the shape of the correlation-function-by-frequency can be changed by multiplying the cross-spectrum-by-frequency by a kernel function spectrum. In this case, the spread of a kernel function changes in accordance with the magnitude of a variance, so the peak of the correlation-function-by-frequency of a frequency at which a target sound source exists can be emphasized. Accordingly, compared to the second example embodiment in which a correlation function of each frequency is not obtained and the peak of a correlation-function-by-frequency is not emphasized, the direction estimation accuracy improves because the peak of a correlation function can be emphasized.

Sixth Example Embodiment

Figure 13:
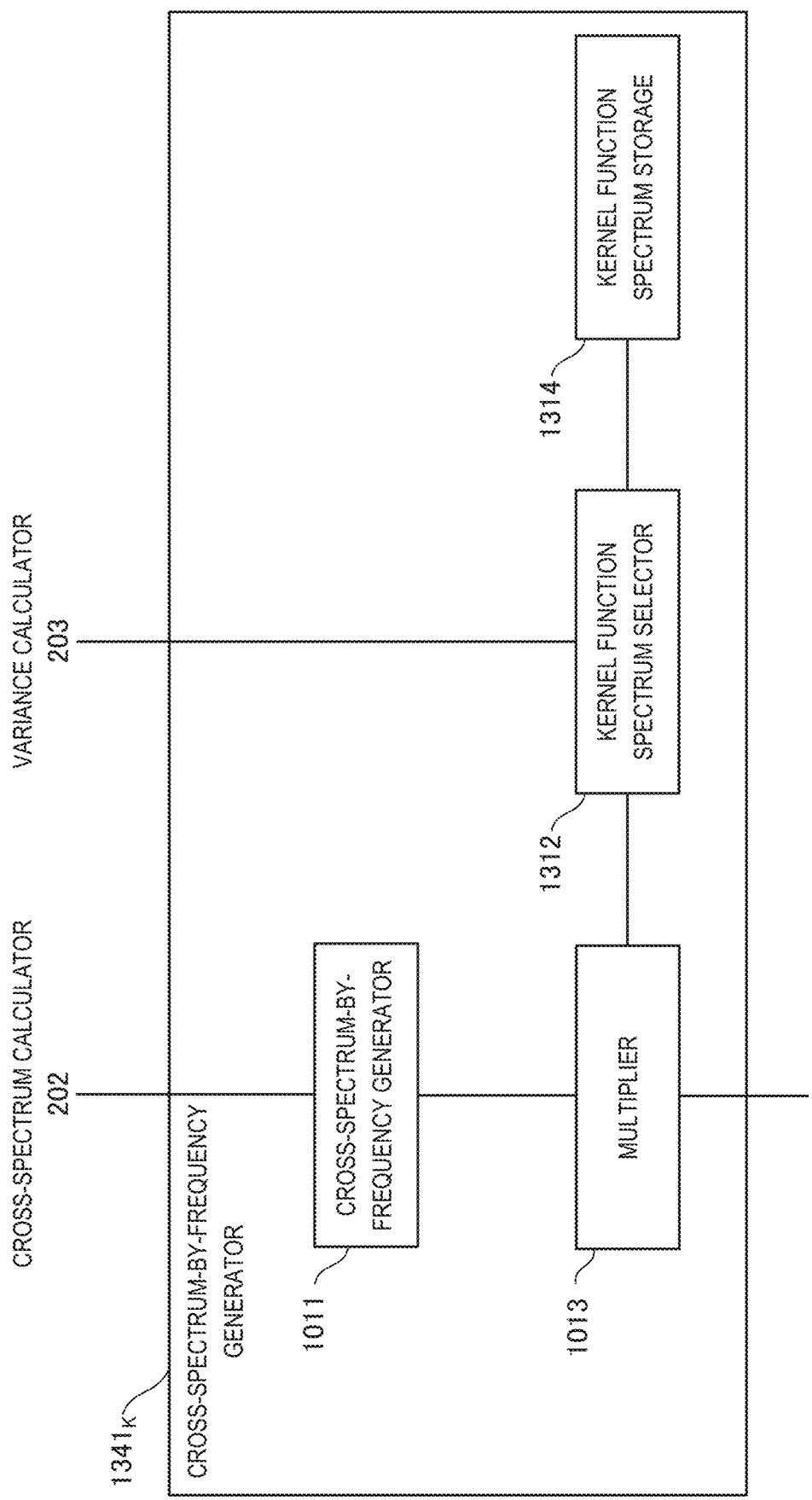
FIG. 13 is a block diagram for explaining the arrangement of cross-spectrum-by-frequency generation of a wave source direction estimation apparatus according to the sixth example embodiment of the present invention.

A wave source direction estimation apparatus according to the sixth example embodiment of the present invention will be explained below with reference to FIG. 13. The wave source direction estimation apparatus according to this example embodiment differs from the wave source direction estimation apparatus of the abovementioned fifth example embodiment in that the apparatus of this example embodiment includes a cross-spectrum-by-frequency generator $1341_k$ instead of the cross-spectrum-by-frequency generator $941_k$. FIG. 13 is a block diagram for explaining the arrangement of the cross-spectrum-by-frequency generator $1341_k$ according to this example embodiment. Compared to the cross-spectrum-by-frequency generator $941_k$ of the fifth example embodiment, the cross-spectrum-by-frequency generator $1341_k$ according to this example embodiment includes a kernel function spectrum storage 1314 and a kernel function spectrum selector 1312, instead of the kernel function spectrum generator 1012. The rest of parts and operations are the same as the fifth example embodiment, so the same reference numerals denote the same parts and operations, and a detailed explanation thereof will be omitted.

FIG. 13 is a block diagram of the cross-spectrum-by-frequency generator $1341_k$. The cross-spectrum-by-frequency generator $1341_k$ includes a cross-spectrum-by-frequency generator 1011, the kernel function spectrum selector 1312, the kernel function spectrum storage 1314, and a multiplier 1013. A cross-spectrum-by-frequency generator $1011_k$ calculates a cross-spectrum corresponding to a frequency k of a cross-spectrum $S_{12}(k,n)$ supplied from a cross-spectrum calculator 202, by using $S_{12}(k,n)$ and a variance supplied from a variance calculator 203, and transmits a cross-spectrum-by-frequency to an integrated correlation function calculator 942.

The kernel function spectrum storage 1314 stores a kernel function spectrum, and transmits the kernel function spectrum to the kernel function spectrum selector 1312. The kernel function spectrum storage 1314 stores a plurality of kernel function spectra corresponding to different variances. For example, the kernel function spectrum storage 1314 stores kernel function spectra corresponding to 10 types of variances (0.1, 0.2, . . . , 1.0) from 0.1 for a step value of 0.1. That is, kernel function spectra corresponding to all vari-

24 ances from 0.1 to 1.0 are calculated beforehand and stored in the kernel function spectrum storage 1314. In this case, 10 types of kernel function spectra are stored. In this example embodiment, $G_{0.1}(w), G_{0.2}(w), \ldots, G_{1.0}(w)$ represent kernel function spectra corresponding to variances of 0.1, 0.2, . . . , 1.0.

As explained in the fifth example embodiment, it is desirable to prepare kernel functions having various widths when generating an integrated correlation function having a clear peak. Accordingly, it is desirable to prepare kernel function spectra corresponding to many variance values, e.g., it is desirable to store kernel function spectra corresponding to 10,000 types of variances (0.001, 0.002, 0.003, . . . ) from 0.001 for a step value of 0.001. However, this poses the problem that the storage capacity increases. Therefore, to generate an integrated correlation function having a clear peak while suppressing the increase in storage capacity, it is necessary to prepare kernel function spectra corresponding to about 5 to 20 types of variances from 0.05 for a step value of 0.05 or 0.1. Note that the step width need not always be uniform. To emphasize the peak of an integrated correlation function, it is favorable to decrease the step width for variance values close to 0, and increase the step width as variance values increase from 0. Also, if a variance value exceeds a given threshold, it is only necessary to prepare a kernel function spectrum corresponding to one type of a variance having a sufficiently large value.

The kernel function spectrum selector 1312 selects one of a plurality of kernel function spectra stored in the kernel function spectrum storage 1314, based on the variance supplied from the variance calculator 203, and transmits the kernel function spectrum to the multiplier 1013. The kernel function spectrum selector 1312 selects a kernel function spectrum generated by a variance value closest to the variance value supplied from the variance calculator 203. For example, if the supplied variance value is 0 to 0.15 (exclusive), the kernel function spectrum $G_{0.1}(w)$ is selected. Likewise, if the supplied variance value is 0.15 (inclusive) to 0.25 (exclusive), the kernel function spectrum $G_{0.2}(w)$ is selected.

<Effects of this Example Embodiment>

According to this example embodiment, kernel functions are calculated in advance, and this makes kernel function calculations unnecessary during the direction estimating process. Therefore, direction estimation can be performed with a calculation amount smaller than that of the fifth example embodiment.

Seventh Example Embodiment

Figure 14:
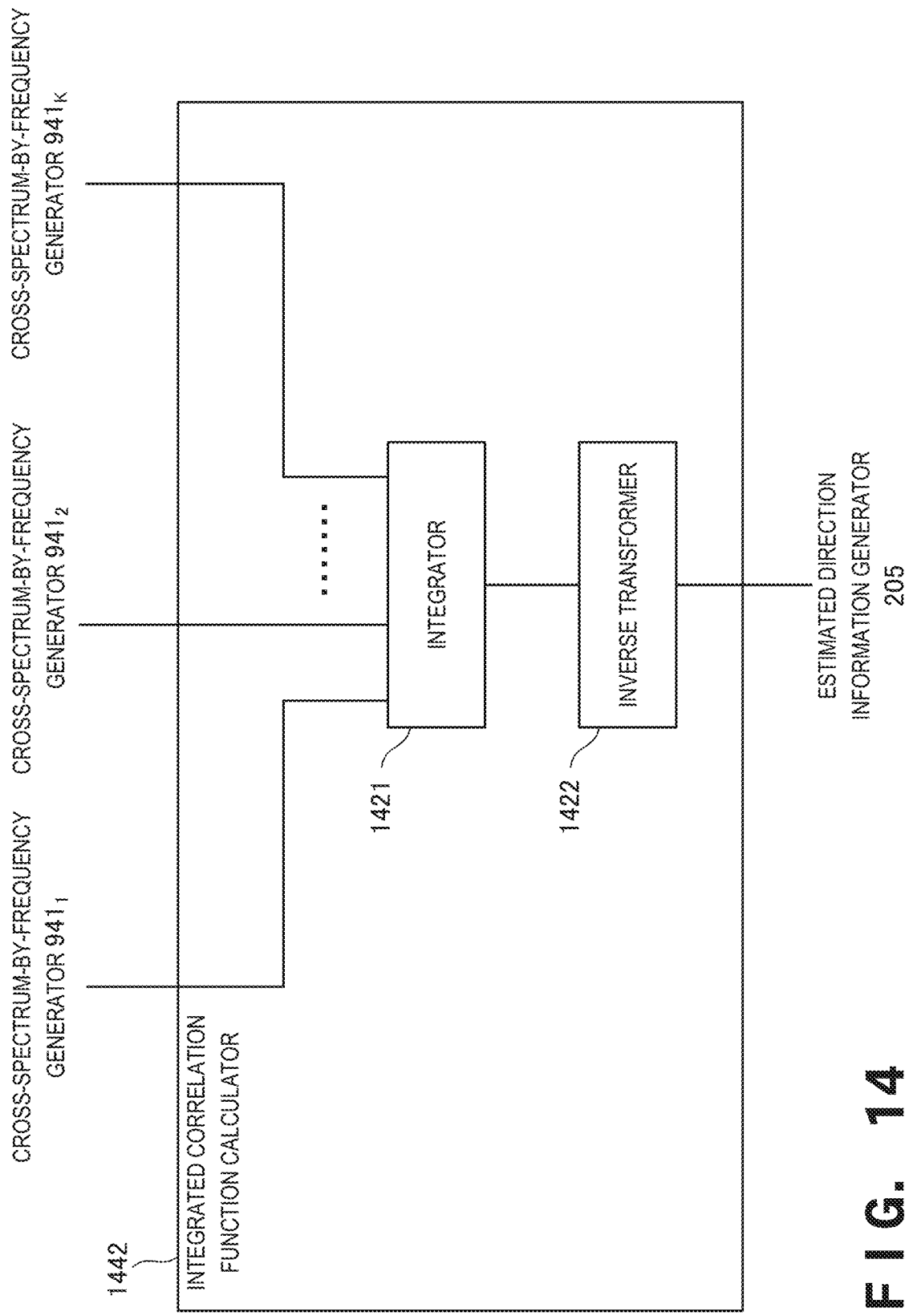
FIG. 14 is a block diagram for explaining the arrangement of an integrated correlation function calculator according to the seventh example embodiment of the present invention.

A wave source direction estimation apparatus according to the seventh example embodiment of the present invention will be explained below with reference to FIG. 14. The wave source direction estimation apparatus according to this example embodiment differs from the wave source direction estimation apparatus of the abovementioned fifth example embodiment in that the apparatus of this example embodiment includes an integrated correlation function calculator 1442 instead of the integrated correlation function calculator 942. FIG. 14 is a block diagram for explaining the arrangement of the integrated correlation function calculator 1442 according to this example embodiment. Compared to the integrated correlation function calculator 942 of the fifth example embodiment, the integrated correlation function calculator 1442 includes an integrator 1421 and an inverse transformer 1422, instead of the inverse transformers $1121_1$, $1121_2$, . . . , $1121_K$ and the integrator 1122. The rest of parts and operations are the same as the fifth example embodiment, so the same reference numerals denote the same parts and operations, and a detailed explanation thereof will be omitted.

FIG. 14 is a block diagram of the integrated correlation function calculator 1442. The integrated correlation function calculator 1442 includes the integrator 1421 and the inverse transformer 1422.

The integrator 1421 integrates cross-spectra-by-frequencies supplied from cross-spectrum-by-frequency generators 941$_1$, 941$_2$, . . . , 941$_K$, and transmits the result as an integrated cross-spectrum to the inverse transformer 1422. That is, one integrated cross-spectrum is obtained by mixing and superposing a plurality of separately obtained cross-spectra-by-frequencies. Like the integrator 1122 of the fifth example embodiment, a sum total or an infinite product is used in the integration. When using a sum total in the integration, letting UM$_k$(0,n), UM$_k$(1,n), . . . , UM$_k$(W·1,n) be the cross-spectra-by-frequencies supplied from the cross-spectrum-by-frequency generator 941$_k$, an integrated cross-spectrum U(k,n) is calculated as follows:

$$U(k, n) = \qquad (44)$$
$$UM_k(0, n) + UM_k(1, n) + \cdots + UM_k(W-1, n) = \sum_{w=0}^{W-1} UM_k(w, n)$$

Also, when using an infinite product, the integrated cross-spectrum U(k,n) is calculated as follows:

$$U(k, n) = \qquad (45)$$
$$UM_k(0, n) \cdot UM_k(1, n) \cdot \cdots \cdot UM_k(W-1, n) = \prod_{w=0}^{W-1} UM_k(w, n)$$

Like the integrator 1122 of the fifth example embodiment, if a frequency at which a target sound source exists or a frequency at which the power of the target sound source is high is already known, correction may also be performed when generating the integrated cross-spectrum U(k,n). In this case, the degree of influence is controlled in the form of frequency selection or weighting, as in the fifth example embodiment. For example, letting Ω be a set of frequencies at which a target sound exists, the integrated cross-spectrum U(k,n) is calculated as follows when obtaining U(k,n) by selecting a band:

$$U(k, n) = \begin{cases} \sum_{w=0}^{W-1} U_k(w, n) & k \in \Omega \\ 0 & k \notin \Omega \end{cases} \qquad (46)$$

Also, when using weighting, U(k,n) is calculated as follows:

$$U(k, n) = \begin{cases} a \cdot \sum_{w=0}^{W-1} U_k(w, n) & k \in \Omega \\ b \cdot \sum_{w=0}^{W-1} U_k(w, n) & k \notin \Omega \end{cases} \qquad (47)$$

where a and b are real numbers and satisfy a>b>0. As described above, when integration is performed by selectively using a correlation-function-by-frequency of a frequency at which a target sound exists, a correlation function in which the influence of a non-target sound such as noise is small can be generated, so the direction estimation accuracy improves.

The inverse transformer 1422 inversely transforms the integrated cross-spectrum supplied from the integrator 1421, and transmits the result as an integrated correlation function to the estimated direction information generator 205. A method of using inverse Fourier transform as inverse transform will be explained in this example embodiment as well. Letting U(k,n) be the integrated cross-spectrum supplied from the integrator 1421, an integrated correlation function u(τ,n) obtained by inverse transform of U(k,n) is calculated as follows:

$$u(\tau, n) = \sum_{k=0}^{K-1} U(k, n) \exp\left(j\frac{2\pi\tau w}{W}\right) \qquad (48)$$

<Effects of this Example Embodiment>

In this example embodiment, an integrated correlation function is obtained by performing inverse transform after cross-spectra-by-frequencies are integrated. Therefore, the number of times of inverse transform is smaller than that of the fifth example embodiment in which inverse transform is performed for each cross-spectrum-by-frequency. This makes it possible to obtain an integrated correlation function with a calculation amount smaller than that of the fifth example embodiment.

Eighth Example Embodiment

Figure 15B:
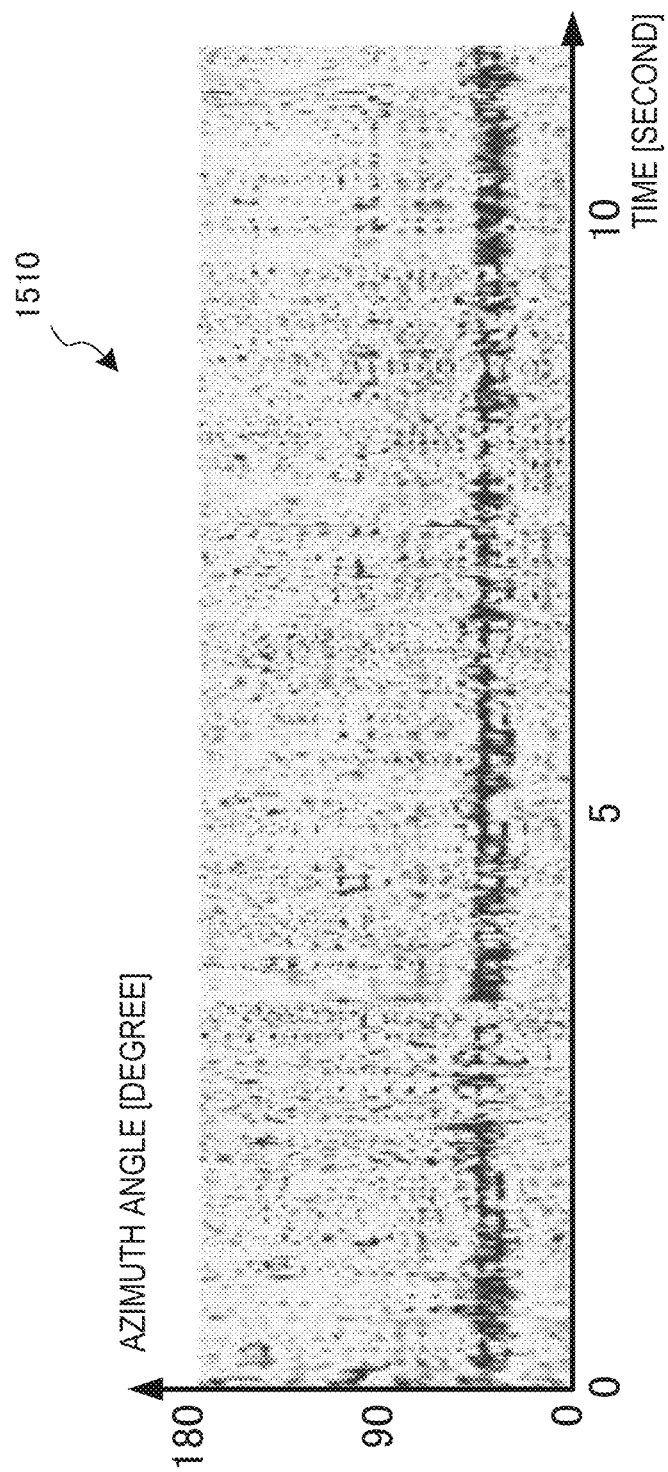
FIG. 15B is a view showing an example of an image displayed on a display unit of the wave source direction estimation system according to the eighth example embodiment of the present invention.

A wave source direction estimation system according to the eighth example embodiment of the present invention will be explained below with reference to FIGS. 15A and 15B. FIG. 15A is a view for explaining the arrangement of a wave source direction estimation system 1500 according to this example embodiment. The wave source direction estimation system 1500 according to this example embodiment uses the wave source direction estimation apparatus according to the abovementioned second example embodiment. Therefore, the same reference numerals as in the second example embodiment denote the same parts and operations, and a detailed explanation thereof will be omitted.

The wave source direction estimation system 1500 according to this example embodiment includes microphones 150$_1$ and 150$_2$, an AD converter 1501, and a display unit 1502. Note that in this example embodiment, wave source direction estimation apparatuses 700 and 800 can be used instead of the wave source direction estimation apparatus 200. Note also that an explanation will be made by assuming that a wave source is a sound source, so an example using microphones will be explained. If a wave source is not a sound source, however, various sensors capable of receiving a wave motion radiated from the wave source and converting the wave motion into an electric signal are used instead of the microphones.

The microphones 150$_1$ and 150$_2$ convert sounds around the apparatus, which include a sound generated from a target object as an estimation target, into electric signals, and transmit the electric signals to the AD converter 1501. When a medium that propagates the sounds is an air medium, the sounds arrive at the microphones as the vibrations of air. The microphones convert the vibrations of air arriving at the microphones into electric signals.

The AD converter 1501 converts the electric signals of the sounds supplied from the microphones $150_1$ and $150_2$ into digital signals, and transmits the digital signals to input terminals $20_1$ and $20_2$.

The display unit 1502 converts estimated direction information supplied from the wave source direction estimation apparatus 200 into visualized data such as an image, and displays the image on a display device such as a display. The basic visualization method is a method of displaying a correlation function at a given time as a two-dimensional graph. In this case, the direction is displayed on the abscissa, and the correlation value is displayed on the ordinate. A method of three-dimensionally displaying a change in correlation function with time, instead of a correlation function at a given time, is also effective. By displaying a change with time, it is possible to clarify the appearance of a target sound source, and predict the moving pattern and moving direction of the target sound source. A method of projecting an image onto not a three-dimensional plane but a two-dimensional plane is also effective. Three-dimensional display has the problem that the back side is difficult to see. When an image is displayed on a plane projected from above, dead angles disappear, and the perspicuity improves. The correlation value may also be expressed by contours, instead of color gradation.

FIG. 15B is a view showing an example of an image 1510 displayed on the display unit 1502 of the wave source direction estimation system 1500 according to this example embodiment, and obtained from the estimated direction information supplied from the wave source direction estimation apparatus 200. This was obtained for the purpose of confirming the effect of this example embodiment. This example was formed by using the sound of a state in which the flying sound of a drone was generated at an azimuth angle of 40° in an outdoor environment. The sound was collected by using two microphones installed at an interval of a few centimeters.

FIG. 15B shows that the darker the color, the higher the correlation value. The range of the azimuth angle is 0° to 180°. The abscissa represents the time. Referring to FIG. 15B, the correlation value is high at an azimuth angle of 40°. This reveals that the drone incoming direction is about 40°.

<Effects of this Example Embodiment>

This example embodiment can accurately estimate the direction of a wave source. In addition, since the estimated direction information is displayed as visualized data such as an image, the user can visually grasp the direction estimation information of a wave source.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

[Other Expressions of Example Embodiments]

Some or all of the above-described example embodiments can also be described as in the following supplementary notes but are not limited to the followings.

(Supplementary Note 1)

There is provided a correlation function generation apparatus comprising a plurality of input signal obtaining units that obtain a wave generated by a wave source as an input signal, a transformer that obtains a plurality of frequency domain signals by transforming a plurality of input signals obtained by the plurality of input signal obtaining units, a cross-spectrum calculator that calculates a cross-spectrum based on the plurality of frequency domain signals, a variance calculator that calculates a variance of the cross-spectrum, and a correlation function calculator that calculates a correlation function based on the cross-spectrum and the variance.

(Supplementary Note 2)

There is provided the correlation function generation apparatus described in supplementary note 1, wherein the variance calculator calculates the variance based on a phase of the cross-spectrum.

(Supplementary Note 3)

There is provided the correlation function generation apparatus described in supplementary note 1, wherein the variance calculator calculates a circular variance of the cross-spectrum.

(Supplementary Note 4)

There is provided the correlation function generation apparatus described in supplementary note 1, wherein the variance calculator calculates the variance based on a cross-spectrum calculated based on a frequency domain signal transformed from an input signal obtained in the past by the input signal obtaining unit.

(Supplementary Note 5)

There is provided the correlation function generation apparatus described in any one of supplementary notes 1 to 4, wherein the correlation function calculator comprises a weighting unit that weights the cross-spectrum based on the variance, and calculates the correlation function based on the weighted cross-spectrum.

(Supplementary Note 6)

There is provided the correlation function generation apparatus described in any one of supplementary notes 1 to 5, further including an average calculator that calculates an average cross-spectrum by averaging the cross-spectra, wherein the variance calculator calculates the variance based on the average cross-spectrum.

(Supplementary Note 7)

There is provided the correlation function generation apparatus described in any one of supplementary notes 1 to 6, wherein the correlation function calculator comprises a cross-spectrum-by-frequency generator that generates a plurality of first cross-spectra-by-frequencies based on the variance and the cross-spectrum, and an integrated correlation function calculator that calculates one correlation function by integrating the plurality of first cross-spectra-by-frequencies.

(Supplementary Note 8)

There is provided the correlation function generation apparatus described in supplementary note 7, wherein the integrated correlation function calculator comprises a first inverse transformer that obtains a plurality of correlation-functions-by-frequencies by calculating inverse transform of the plurality of first cross-spectra-by-frequencies, and a first integrator that calculates one correlation function by integrating the plurality of correlation-functions-by-frequencies calculated by the first inverse transformer.

(Supplementary Note 9)

There is provided the correlation function generation apparatus described in supplementary note 7 or 8, wherein the cross-spectrum-by-frequency generator comprises a kernel function spectrum generator that generates a kernel function spectrum based on the variance, and a multiplier that obtains a plurality of second cross-spectra-by-frequencies by multiplying the plurality of first cross-spectra-by-frequencies by the kernel function spectrum.

(Supplementary Note 10)

There is provided the correlation function generation apparatus described in supplementary note 9, wherein the cross-spectrum-by-frequency generator further comprises a kernel function spectrum storage that stores a plurality of kernel function spectra, and a kernel function spectrum selector that selects one of the plurality of kernel function spectra stored in the kernel function spectrum storage, based on the variance, and the multiplier obtains the plurality of second cross-spectra-by-frequencies by multiplying the plurality of first cross-spectra-by-frequencies by the selected kernel function spectrum.

(Supplementary Note 11)

There is provided the correlation function generation apparatus described in any one of supplementary notes 7 to 10, wherein the integrated correlation function calculator comprises a second integrator that obtains one integrated cross-spectrum by integrating the plurality of first cross-spectra-by-frequencies, and a second inverse transformer that obtains one correlation function by calculating inverse transform of the one integrated cross-spectrum.

(Supplementary Note 12)

There is provided a correlation function generation method comprising performing a plurality of input signal obtaining steps of obtaining a wave generated by a wave source as an input signal, obtaining a plurality of frequency domain signals by transforming a plurality of input signals obtained by a plurality of input signal obtaining units, calculating a cross-spectrum based on the plurality of frequency domain signals, calculating a variance of the cross-spectrum, and calculating a correlation function based on the cross-spectrum and the variance.

(Supplementary Note 13)

There is provided a correlation function generation program for causing a computer to execute a method, comprising performing a plurality of input signal obtaining steps of obtaining a wave generated by a wave source as an input signal, obtaining a plurality of frequency domain signals by transforming a plurality of input signals obtained by a plurality of input signal obtaining units, calculating a cross-spectrum based on the plurality of frequency domain signals, calculating a variance of the cross-spectrum, and calculating a correlation function based on the cross-spectrum and the variance.

(Supplementary Note 14)

There is provided a wave source direction estimation apparatus including a correlation function generation apparatus described in any one of supplementary notes 1 to 11, and estimating a direction of the wave source based on a correlation function generated by the correlation function generation apparatus.

What is claimed is:

1. A correlation function generation apparatus comprising:
    a memory configured to store instructions; and
    a processor configured to execute the instructions to:
        obtain a plurality of input signals associated with ambient noise and a target sound source, the plurality of input signals detected by at least two microphones;
        obtain a plurality of frequency domain signals by transforming the plurality of input signals;
        calculate a cross-spectrum based on said plurality of frequency domain signals;
        obtain a circular variance of said cross-spectrum as a variance of a phase of said cross-spectrum; and
        generate a correlation function to be used for estimating a direction of said target sound source, based on said cross-spectrum weighted by a weight calculated from said obtained circular variance, wherein the weight is inversely proportional to the obtained circular variance.

2. The correlation function generation apparatus according to claim 1, wherein the processor is further configured to execute the instructions to calculate an average cross-spectrum by averaging said cross-spectra, and
    calculate said circular variance based on said average cross-spectrum.

3. The correlation function generation apparatus according to claim 1, wherein
    the processor is configured to execute the instructions to calculate one correlation function by generating a plurality of cross-spectra-by-frequencies based on said circulate variance and said cross-spectrum, and
    integrating said plurality of cross-spectra-by-frequencies.

4. The correlation function generation apparatus according to claim 3, wherein
    the processor is configured to execute the instructions to calculate said one correlation function by obtaining a plurality of correlation-functions-by-frequencies by calculating inverse transform of said plurality of first cross-spectra-by-frequencies, and
    integrating said plurality of correlation-functions-by-frequencies that have been calculated inverse transform.

5. The correlation function generation apparatus according to claim 3, wherein
the processor is configured to execute the instructions to generate said plurality of cross-spectra-by-frequencies by generating a kernel function spectrum based on said variance, and
multiplying said cross-spectra-by-frequencies by said kernel function spectrum.

6. The correlation function generation apparatus according to claim 3, wherein
the processor is configured to execute the instructions to generate said plurality of cross-spectra-by-frequencies by selecting one of a plurality of kernel function spectra stored in a kernel function spectrum storage, based on said circulate variance, and
multiplying said cross-spectra-by-frequencies by said selected kernel function spectrum.

7. The correlation function generation apparatus according to claim 3, wherein the processor is configured to execute the instructions to calculate the one correlation function by obtaining one integrated cross-spectrum by integrating said plurality of cross-spectra-by-frequencies, and
calculating inverse transform of said one integrated cross-spectrum.

8. The correlation function generation apparatus according to claim 1, wherein the processor is further configured to execute the instructions to estimate a direction of said target sound source based on the correlation function.

9. A correlation function generation method comprising:
obtaining a plurality of input signals associated with ambient noise and a target sound source, the plurality of input signals detected by at least two microphones;
obtaining a plurality of frequency domain signals by transforming the plurality of input signals;
calculating a cross-spectrum based on said plurality of frequency domain signals;
obtain a circular variance of said cross-spectrum as a variance of a phase of said cross-spectrum; and
generate a correlation function to be used for estimating a direction of said target sound source, based on said cross-spectrum weighted by a weight calculated from said obtained circular variance, wherein the weight is inversely proportional to the obtained circular variance.

10. The correlation function generation method of claim 9, further comprising:
estimating a direction of said target sound source based on the correlation function.

11. A non-transitory computer readable storage medium storing a correlation function generation program for causing a computer to execute a method, the method comprising:
obtaining a plurality of input signals associated with ambient noise and a target sound source, the plurality of input signals detected by at least two microphones;
obtaining a plurality of frequency domain signals by transforming the plurality of input signals;
calculating a cross-spectrum based on said plurality of frequency domain signals;
obtain a circular variance of said cross-spectrum as a variance of a phase of said cross-spectrum; and
generate a correlation function to be used for estimating a direction of said target sound source, based on said cross-spectrum weighted by a weight calculated from said obtained circular variance, wherein the weight is inversely proportional to the obtained circular variance.

12. The non-transitory computer readable storage medium of claim 11, further comprising:
estimating a direction of said target sound source based on the correlation function.

* * * * *